United States Patent
Qi et al.

(10) Patent No.: US 12,165,327 B2
(45) Date of Patent: Dec. 10, 2024

(54) IMAGE PROCESSING METHOD, APPARATUS, AND DEVICE, AND STORAGE MEDIUM

(71) Applicant: TENCENT TECHNOLOGY (SHENZHEN) COMPANY LIMITED, Shenzhen (CN)

(72) Inventors: Lu Qi, Shenzhen (CN); Li Jiang, Shenzhen (CN); Shu Liu, Shenzhen (CN); Xiaoyong Shen, Shenzhen (CN); Jiaya Jia, Shenzhen (CN); Yuwing Tai, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 658 days.

(21) Appl. No.: 17/330,380

(22) Filed: May 25, 2021

(65) Prior Publication Data

US 2021/0279503 A1   Sep. 9, 2021

Related U.S. Application Data

(63) Continuation of application No. PCT/CN2020/082109, filed on Mar. 30, 2020.

(30) Foreign Application Priority Data

Apr. 25, 2019   (CN) .......................... 201910338835.0

(51) Int. Cl.
*G06T 7/11*   (2017.01)
*G06F 18/214*   (2023.01)
(Continued)

(52) U.S. Cl.
CPC .............. *G06T 7/11* (2017.01); *G06F 18/214* (2023.01); *G06F 18/2413* (2023.01);
(Continued)

(58) Field of Classification Search
None
See application file for complete search history.

(56) References Cited

U.S. PATENT DOCUMENTS

| 2018/0144477 A1 | 5/2018 | Shi |
| 2018/0259970 A1 | 9/2018 | Wang et al. |

(Continued)

FOREIGN PATENT DOCUMENTS

| CN | 106097353 A | 11/2016 |
| CN | 106780536 A | 5/2017 |

(Continued)

OTHER PUBLICATIONS

He et al., "Mask R-CNN," Proceedings of the IEEE International Conference on Computer Vision (ICCV), pp. 2961-2969 (Year: 2017).*

(Continued)

*Primary Examiner* — Vincent Rudolph
*Assistant Examiner* — Nicholas Crespo Stazer
(74) *Attorney, Agent, or Firm* — ANOVA LAW GROUP, PLLC

(57) ABSTRACT

An image processing method includes: obtaining an image, and performing feature extraction on the image; generating at least one candidate region of the image, and mapping the at least one candidate region into a feature map of the image, one candidate region including one instance; processing the mapped feature map based on a target network for instance segmentation; and indicating an overall structure of an occluded instance in the image by using a perspective mask, and indicating an invisible part of the occluded instance by using a non-perspective mask, the perspective mask and the non-perspective mask representing a relative occlusion relationship of the occluded instance.

20 Claims, 15 Drawing Sheets

(51) Int. Cl.
- *G06F 18/2413* (2023.01)
- *G06F 18/25* (2023.01)
- *G06N 3/08* (2023.01)
- *G06V 10/44* (2022.01)
- *G06V 10/46* (2022.01)
- *G06V 10/80* (2022.01)
- *G06V 10/82* (2022.01)
- *G06V 20/56* (2022.01)

(52) U.S. Cl.
CPC ............ *G06F 18/253* (2023.01); *G06N 3/08* (2013.01); *G06V 10/44* (2022.01); *G06V 10/462* (2022.01); *G06V 10/806* (2022.01); *G06V 10/82* (2022.01); *G06V 20/56* (2022.01)

(56) References Cited

U.S. PATENT DOCUMENTS

| | | |
|---|---|---|
| 2019/0057507 A1 | 2/2019 | El-Khamy et al. |
| 2020/0097756 A1* | 3/2020 | Hashimoto ............ G06V 10/25 |
| 2020/0334819 A1 | 10/2020 | Chen et al. |
| 2020/0372648 A1 | 11/2020 | Zhang et al. |

FOREIGN PATENT DOCUMENTS

| | | | |
|---|---|---|---|
| CN | 108710919 A | * 10/2018 | ........... G06K 9/6256 |
| CN | 108734211 A | 11/2018 | |
| CN | 109389078 A | 2/2019 | |
| CN | 109447169 A | 3/2019 | |
| CN | 109583517 A | 4/2019 | |
| CN | 110070056 A | 7/2019 | |

OTHER PUBLICATIONS

Zhu et al., "Semantic Amodal Segmentation," Proceedings of the IEEE Conference on Computer Vision and Pattern Recognition (CVPR), pp. 1464-1472 (Year: 2017).*

Follman et al., "Learning to See the Invisible: End-to-End Trainable Amodal Instance Segmentation," 2019 IEEE Winter Conference on Applications of Computer Vision (WACV), pp. 1328-1336 (Year: 2019).*

The World Intellectual Property Organization (WIPO) International Search Report for PCT/CN2020/082109 Jul. 3, 2020 6 Pages (including translation).

The European Patent Office (EPO) The Extended European Search Report for 20795422.3 Jun. 10, 2022 9 pages.

* cited by examiner

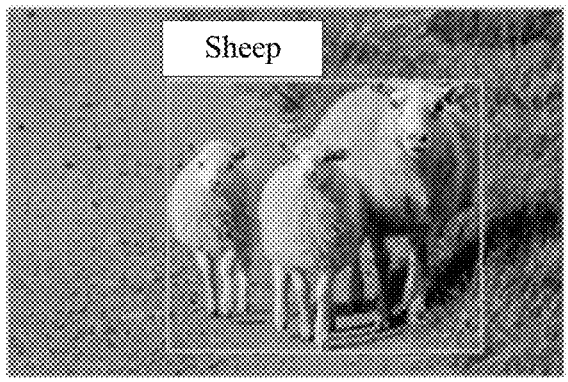
Classification and positioning
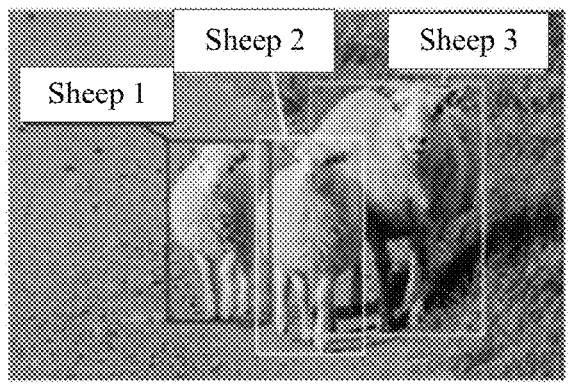
Object detection
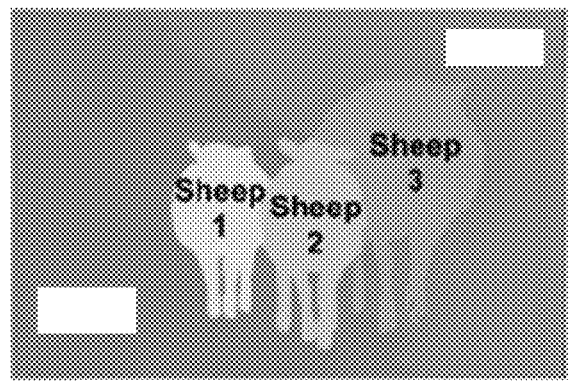
Instance segmentation
FIG. 1

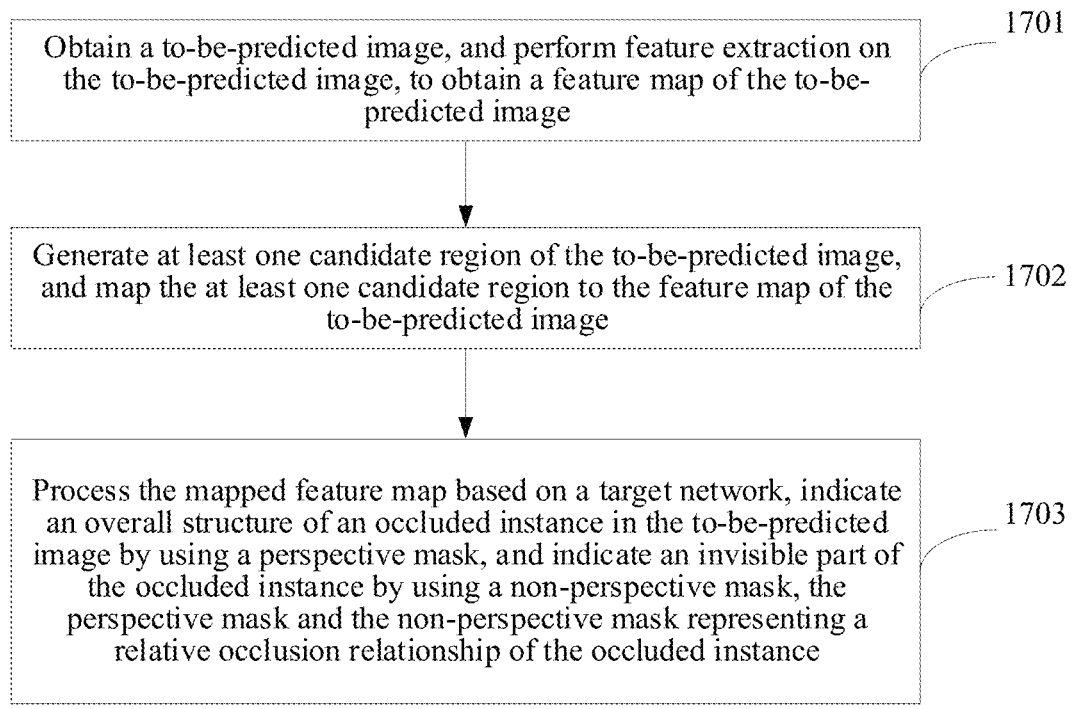

FIG. 16

Obtain a to-be-predicted image, and perform feature extraction on the to-be-predicted image, to obtain a feature map of the to-be-predicted image — 1701

Generate at least one candidate region of the to-be-predicted image, and map the at least one candidate region to the feature map of the to-be-predicted image — 1702

Process the mapped feature map based on a target network, indicate an overall structure of an occluded instance in the to-be-predicted image by using a perspective mask, and indicate an invisible part of the occluded instance by using a non-perspective mask, the perspective mask and the non-perspective mask representing a relative occlusion relationship of the occluded instance — 1703

FIG. 17

IMAGE PROCESSING METHOD, APPARATUS, AND DEVICE, AND STORAGE MEDIUM

CROSS-REFERENCES TO RELATED APPLICATIONS

This application is a continuation application of PCT Patent Application No. PCT/CN2020/082109, entitled "IMAGE PROCESSING METHOD, APPARATUS AND DEVICE, AND STORAGE MEDIUM" and filed on Mar. 30, 2020, which claims priority to Chinese Patent Application No. 201910338835.0, entitled "IMAGE PROCESSING METHOD, APPARATUS, AND DEVICE, AND STORAGE MEDIUM" and filed with the China National Intellectual Property Administration on Apr. 25, 2019, all of which are incorporated herein by reference in their entirety.

FIELD OF THE TECHNOLOGY

The present disclosure relates to the field of artificial intelligence (AI) technologies and the field of computer vision technologies, and in particular, to an image processing method, apparatus, and device, and a storage medium.

BACKGROUND OF THE DISCLOSURE

Instance segmentation is an image recognition technology used for searching an image for each instance and determining a category of each instance. This technology is usually used for accurately positioning a vehicle ahead in the field of self-driving, assisting in selecting a subsequent driving control strategy.

However, an instance in an image includes a visible part and an invisible part that is occluded. During segmentation of the instance, not only the visible part needs to be obtained through segmentation, but also the invisible part of the instance that is occluded needs to be deduced. In this way, a complete target can be determined.

Therefore, how to process an image so as to deduce an invisible part of each instance that is occluded in the image draws attention of persons skilled in the art.

SUMMARY

Embodiments of the present disclosure provide an image processing method, apparatus, and device, and a storage medium. The technical solutions are as follows:

An image processing method, performed by an image processing device, the method including: obtaining an image, and performing feature extraction on the image: generating at least one candidate region of the image, and mapping the at least one candidate region into a feature map of the image, one candidate region including one instance: processing the mapped feature map based on a target network for instance segmentation; and indicating an overall structure of an occluded instance in the image by using a perspective mask, and indicating an invisible part of the occluded instance by using a non-perspective mask, the perspective mask and the non-perspective mask representing a relative occlusion relationship of the occluded instance.

An image processing apparatus, disposed in an image processing device, the apparatus including: an obtaining module, configured to obtain an image; a feature extraction module, configured to perform feature extraction on the image, to obtain a feature map of the image: a generation module, configured to generate at least one candidate region of the image: a mapping module, configured to map the at least one candidate region to the feature map of the image, one candidate region including one instance; and a processing module, configured to process the mapped feature map based on a target network for instance segmentation, indicate an overall structure of an occluded instance in the image by using a perspective mask, and indicate an invisible part of the occluded instance by using a non-perspective mask, the perspective mask and the non-perspective mask representing a relative occlusion relationship of the occluded instance.

One or more non-transitory computer-readable storage media are provided, each storage medium storing at least one computer-readable instruction, the at least one computer-readable instruction being loaded and executed by one or more processors to implement: obtaining an image, and performing feature extraction on the image: generating at least one candidate region of the image, and mapping the at least one candidate region into a feature map of the image, one candidate region including one instance: processing the mapped feature map based on a target network for instance segmentation; and indicating an overall structure of an occluded instance in the image by using a perspective mask, and indicating an invisible part of the occluded instance by using a non-perspective mask, the perspective mask and the non-perspective mask representing a relative occlusion relationship of the occluded instance.

An image processing device, including one or more processors and a memory, the memory storing at least one computer-readable instruction, the at least one computer-readable instruction being loaded and executed by the one or more processors to implement: obtaining an image, and performing feature extraction on the image: generating at least one candidate region of the image, and mapping the at least one candidate region into a feature map of the image, one candidate region including one instance: processing the mapped feature map based on a target network for instance segmentation; and indicating an overall structure of an occluded instance in the image by using a perspective mask, and indicating an invisible part of the occluded instance by using a non-perspective mask, the perspective mask and the non-perspective mask representing a relative occlusion relationship of the occluded instance.

Details of one or more embodiments of the present disclosure are provided in the accompanying drawings and descriptions below. Based on the specification, the accompanying drawings, and the claims of the present disclosure, other features, objectives, and advantages of the present disclosure become clearer.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show only some embodiments of the present disclosure, and a person of ordinary skill in the art may still derive other drawings from these accompanying drawings without creative efforts.

FIG. 1 is a schematic diagram of an image according to an embodiment of the present disclosure.

FIG. 16 is a schematic diagram of another image according to an embodiment of the present disclosure.

FIG. 17 is a flowchart of an image processing method according to an embodiment of the present disclosure.

DESCRIPTION OF EMBODIMENTS

Figure 2:
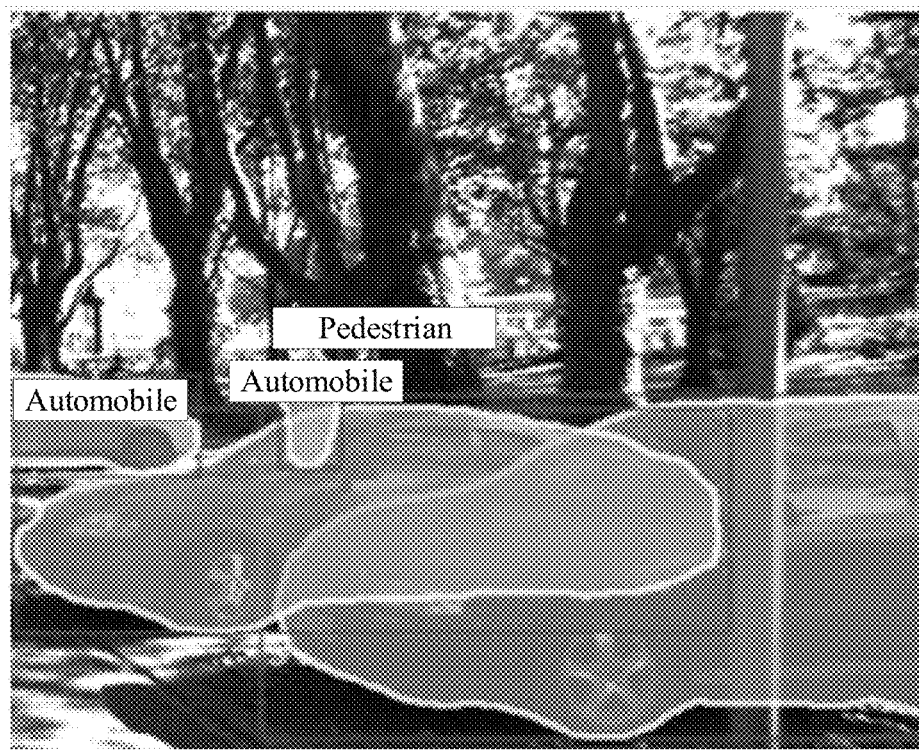
FIG. 2 is a schematic diagram of another image according to an embodiment of the present disclosure.

To make the objectives, technical solutions, and advantages of the present disclosure clearer, the following further describes implementations of the present disclosure in detail with reference to the accompanying drawings. It is to be understood that the specific implementations described herein are only used to describe the present disclosure, instead of limiting the present disclosure.

Before the embodiments of the present disclosure are explained and described in detail, some terms involved in the embodiments of the present disclosure are explained and described first.

Instance: In the embodiments of the present disclosure, an instance refers to a specific target or object appearing in an image. For example, in a self-driving scenario, the instance may be a vehicle or person appearing ahead.

Instance segmentation: It is an image recognition technology used for searching an image for each instance and determining a category of each instance. In other words, instance segmentation is a task of recognizing a contour of a target at a pixel level. For example, a machine automatically marks different instances from an image by using a target detection method, and then annotates pixels one by one in different instance regions by using a semantic segmentation method.

In an example, instance segmentation is usually used for accurately positioning a vehicle ahead in the field of self-driving, assisting in selecting a subsequent driving control strategy.

Example 1: In a semantic segmentation method, different instances that belong to the same category are not distinguished. For example, if there are two cats in an image, all pixels of the two cats are predicted as a category of cat by using the semantic segmentation method. In instance segmentation, which pixels in the image belong to the first cat and which pixels belong to the second cat need to be distinguished.

Example 2: FIG. 1 shows differences among classification and positioning, object detection, and instance segmentation.

The upper left diagram shows a result of processing an image by using classification and positioning. Image classification processing is to assign a category label to the image, and positioning is to obtain a position of a target in the image.

The upper right diagram shows a result of processing the same image by using object detection. The object detection is performed starting from a group of fixed categories that users are interested in. Every time any one of the categories appears in the inputted image, a bounding box is drawn around an object belonging to the category, and a category label of the object is predicted. A difference between the classification and positioning and the object detection lies in that in the object detection, classification is only performed on a single target, and a bounding box of the single target is drawn.

The lower diagram in FIG. 1 shows a result of processing the same image by using instance segmentation. Instance segmentation is a technology combining semantic segmentation with target detection. For a given image, positions and identities of targets in the image can be predicted (which is similar to target detection). However, it is better to predict an entire segmentation mask of a target than to predict a bounding box of the target. That is, which pixel corresponds to which target in the inputted image is predicted. Correspondingly, each sheep in the image has a different segmentation mask.

However, in semantic segmentation, segmentation masks of all the sheep are the same. That is, semantic segmentation is a strategy of outputting a category of each pixel. In other words, in semantic segmentation, each pixel is classified into one of several possible categories. This means that all pixels indicating a sheep in FIG. 1 are classified into one category, and two different sheep are not distinguished in output.

Perspective instance segmentation (also called amodal segmentation): As a new direction of the instance segmentation technology, perspective instance segmentation aims to imitate a human capability to segment each instance in an image, the segmented instance further including an invisible part of the instance that is occluded. That is, perspective instance segmentation is similar to a deduction capability of human vision, by which an invisible part of an instance that is occluded may be deduced based on a visible part of the instance that is not occluded, so as to determine a complete target.

Perspective mask: It is a binary mask that can describe whether a given pixel belongs to a part of an instance. For example, if a pixel belongs to an instance, an identifier is 1, and if the pixel does not belong to the instance, the identifier is 0.

In the embodiments of the present disclosure, a perspective mask is specific to an overall structure of an instance, which includes both a visible part and an invisible part of the instance. In other words, the perspective mask is used for indicating the overall structure of the instance.

In an example, a non-perspective mask of an instance may be obtained through calculation based on a perspective mask and a relative occlusion order of the instance. The non-perspective mask is also a binary mask, and is also used for describing whether a given pixel belongs to a part of the instance. However, the non-perspective mask is only specific to an invisible part of the instance. That is, the non-perspective mask indicates the invisible part of the instance that is occluded. In addition, a perspective mask and a non-perspective mask of an occluded instance can further represent a relative occlusion relationship of the instance.

As described above, perspective instance segmentation needs to deduce a complex structure of an instance. Consequently, although this task is important and futuristic, the related art lacks a large-scale dataset that is annotated in detail because it is difficult to mark an invisible part of the instance correctly and consistently. This results in a huge obstacle to exploring the frontier of visual recognition. A data-driven deep learning method is restricted by the lack of datasets, which further limits the exploration of the perspective instance segmentation task. In addition, in the related art, the perspective instance segmentation task usually uses a conventional instance segmentation network, such as a Mask R-CNN model. There is no special improvement for the perspective instance segmentation task.

Figure 3:
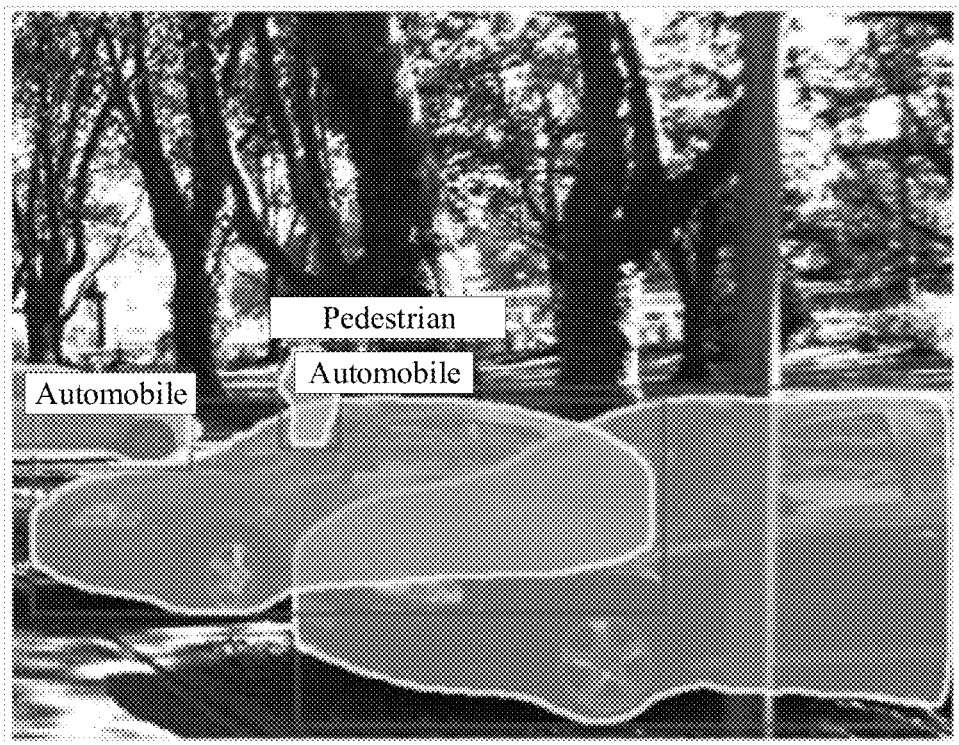
FIG. 3 is a schematic diagram of another image according to an embodiment of the present disclosure.

In other words, the related art lacks a large-scale perspective instance dataset that is annotated in detail and a network that is specific to the perspective instance segmentation task. The related art does not explore the perspective instance segmentation task, and therefore the related art does not meet requirements of products. As shown in FIG. 2 and FIG. 3, as a quantity of times of training increases, a capability of the Mask R-CNN model for deducing an occluded part of an instance becomes poorer. FIG. 2 corresponds to 20,000 times of training, and FIG. 3 corresponds to 24,000 times of training.

Based on the foregoing described problems, an embodiment of the present disclosure proposes an image processing method. This method can not only predict a pixel-level position of each instance in an image, but also infer an invisible part of the each instance that is occluded.

In one embodiment of the present disclosure, on one hand, a large-scale perspective instance dataset is finely annotated. In an example, in terms of quantity, the dataset includes about 15,000 images. In terms of quality, in one embodiment of the present disclosure, a semantic label, a perspective mask, and a relative occlusion order of each instance are annotated. Therefore, a non-perspective mask of the each instance may be easily obtained through calculation, which makes the dataset more universal.

On the other hand, one embodiment of the present disclosure proposes a multitasking framework of multi-branch coding (also called multi-view coding). Such a network can better deduce an invisible part of an instance that is occluded, so that the network has a deduction capability similar to human vision.

An implementation environment involved in the image processing method provided in one embodiment of the present disclosure is described below in detail.

Figure 4:
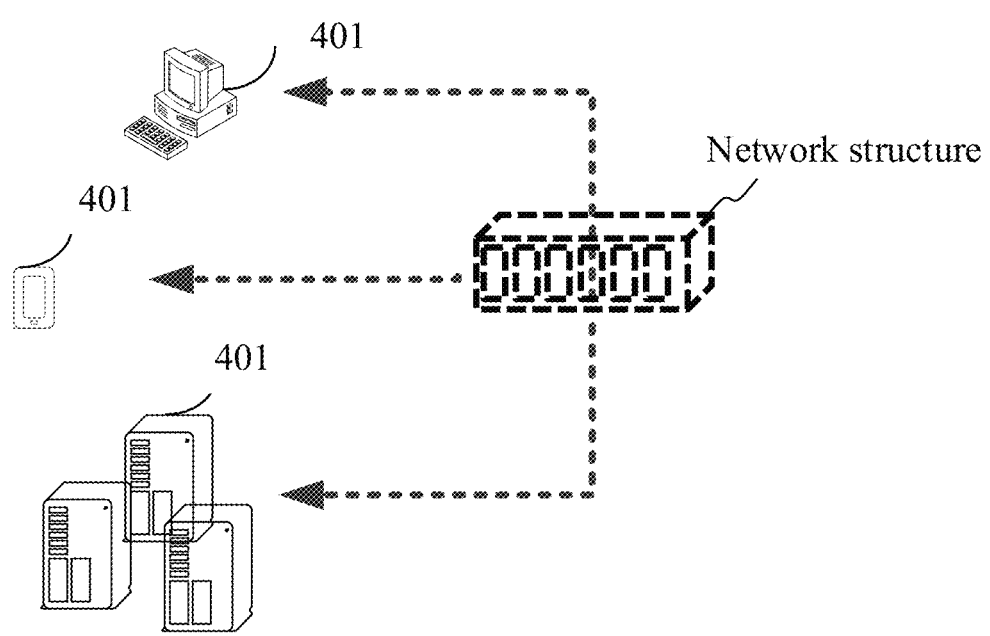
FIG. 4 is a schematic diagram of an implementation environment involved in an image processing method according to an embodiment of the present disclosure.

Referring to FIG. 4, the implementation environment includes: an image processing device 401. The image processing device 401 is a computer device with a machine learning capability. For example, the computer device may be a fixed computer device such as a personal computer, a server, or the like. Alternatively, the computer device may be a mobile computer device such as a tablet computer, a smartphone, an ebook reader, or the like. This is not specifically limited in this embodiment of the present disclosure.

Figure 5:
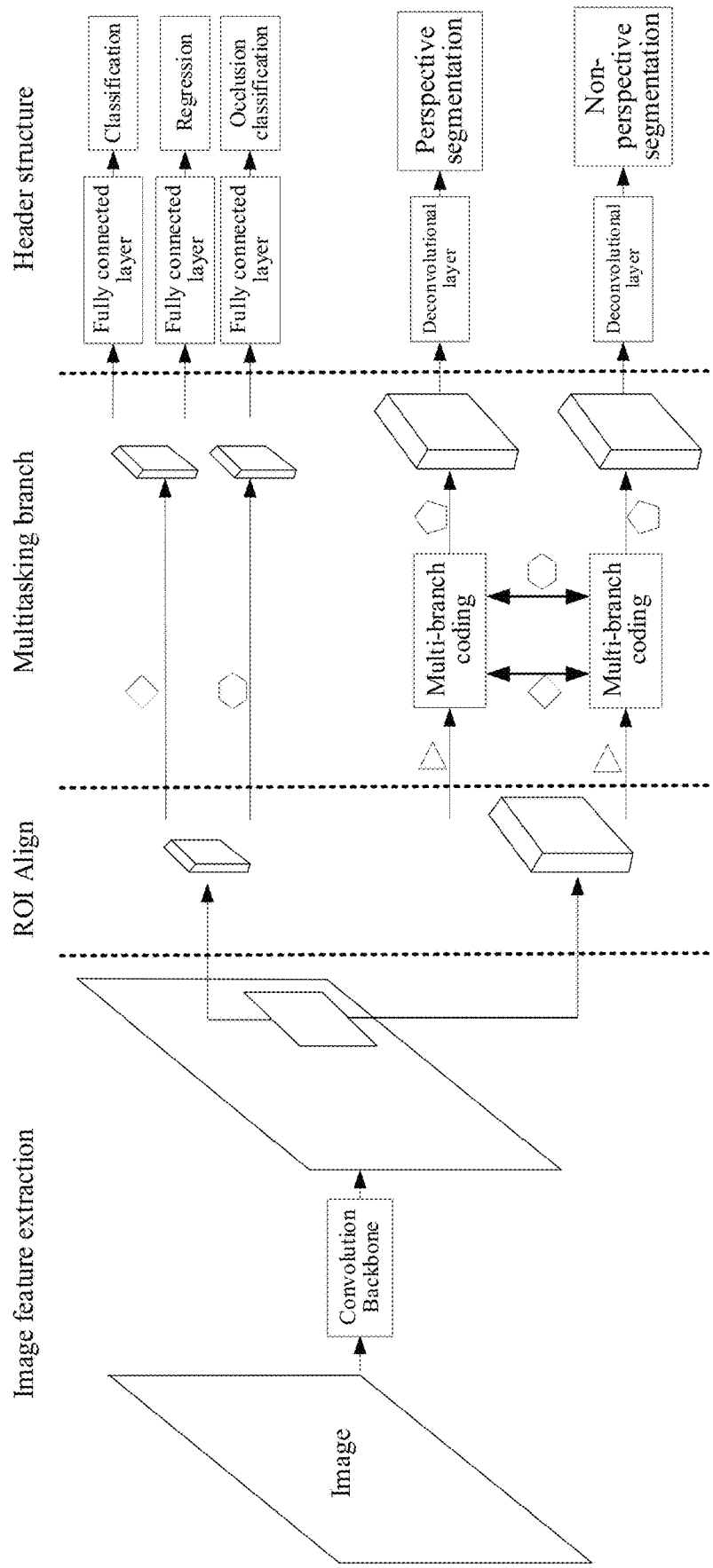
FIG. 5 is a structural diagram of a network structure involved in image processing method according to an embodiment of the present disclosure.
Figure 6:
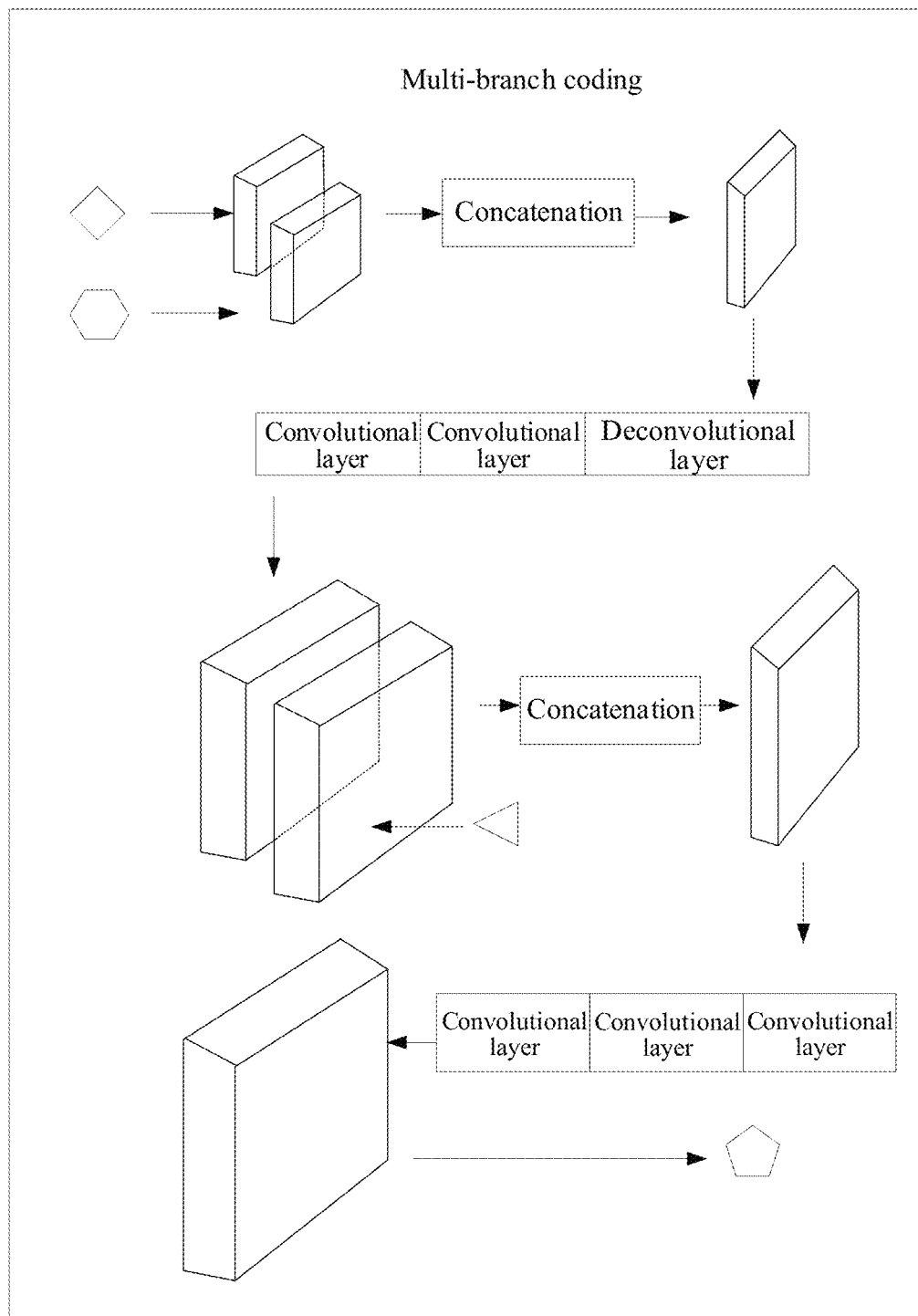
FIG. 6 is a schematic diagram of a process of multi-branch coding according to an embodiment of the present disclosure.

In one embodiment of the present disclosure, the image processing device 401 is provided with a network shown in FIG. 5. A detailed structure of multi-branch coding in the network is shown in FIG. 6.

The image processing device 401 is configured to receive an externally inputted to-be-predicted image, and perform the image processing method provided in one embodiment of the present disclosure based on the network.

In an embodiment, by using an example in which the image processing method is applied to a self-driving scenario in the field of AI, the to-be-predicted image may be a streetscape image captured by a photographing device. In other words, the photographing device may be a camera disposed on a self-driving vehicle. That is, the image processing method provided in one embodiment of the present disclosure may be applied to the field of AI. For example, the method may be applied to a self-driving vehicle in the field of AI. In addition, the application scenario in one embodiment of the present disclosure includes, but is not limited to, a self-driving scenario and other scenario used for simulating human intelligence. As an emerging science and technology currently studied and developed for simulating, extending, and expanding human intelligence, AI has been widely applied to image processing, facial recognition, gaming, medical care, and other fields.

The image processing method provided in one embodiment of the present disclosure involves a large-scale training dataset that is annotated in detail and the network shown in FIG. 5.

In terms of the training dataset, as described above, for each image in the training dataset, each instance in the image is annotated, and annotation information includes a semantic label, a relative occlusion order, and a perspective mask. The network shown in FIG. 5 is trained based on the training dataset, which makes it possible for the image processing device 401 provided with the network to perform perspective instance segmentation.

In terms of the network, for a perspective instance segmentation task, one embodiment of the present disclosure further provides an occlusion classification branch on the basis of a classification and regression branch and a Mask branch. The classification and regression branch is configured for detecting a semantic label of an instance and a general region of the instance in an image, the Mask branch is configured for further performing accurate mask segmentation on the general region of the instance, and the occlusion classification branch is configured for determining whether the instance is occluded, and providing occlusion classification information.

In addition, one embodiment of the present disclosure further proposes multi-branch coding. That is, in one embodiment of the present disclosure, feature information of the classification and regression branch, feature information of the occlusion classification branch, and feature information of the Mask branch are fused. Fused feature information assists the Mask branch in deducing perspective instance segmentation.

In one embodiment of the present disclosure, the Mask branch is further divided into the two branches shown in FIG. 5. The two branches are configured for performing perspective segmentation and non-perspective segmentation respectively, and respectively correspond to an overall structure of an instance and an invisible part of the instance. A non-perspective segmentation branch in this specification is also referred to as a first mask branch, and a perspective segmentation branch may also be referred to as a second mask branch.

The training dataset involved in one embodiment of the present disclosure is described below.

In one embodiment of the present disclosure, the training dataset may also be referred to as a perspective instance dataset. In an embodiment, in a self-driving scenario, the training dataset may come from a self-driving dataset KITTI, which also referred to as a KITTI INStance dataset (KINS).

In an embodiment of the present disclosure, 14991 images are annotated in the KITTI dataset, to form a large-scale perspective instance dataset, that is, KINS.

In an embodiment, the dataset is divided into two parts. 7474 images are used for model or network training, and the remaining 7517 images are used for network or model testing.

In an embodiment, there are three types of instance annotation: a perspective mask, a semantic label, and a relative occlusion order.

In one embodiment of the present disclosure, to obtain high-quality and consistent annotation information, the following three instance annotation rules may be followed:

(1) Semantic annotation is performed in a specific semantic category.

(2) A relative occlusion order of an instance in an image is annotated.

(3) Pixel-level annotation is performed on each instance, including an invisible part of the each instance that is occluded.

Based on the foregoing three rules, in one embodiment of the present disclosure, the following steps may be performed to mark instances in an image.

First, for each image, a senior annotator may annotate a special type and a bounding box of a specific instance in the image. An annotation order further needs to follow a relative occlusion order from the near to the distant.

Second, N annotators perform perspective mask annotation on each instance in the image. In an embodiment, a value of N may be 3, that is, three annotators perform perspective mask annotation on the same instance. This is not specifically limited in this embodiment of the present disclosure.

Third, pixel-level annotations of each annotator are aggregated.

Figure 7:
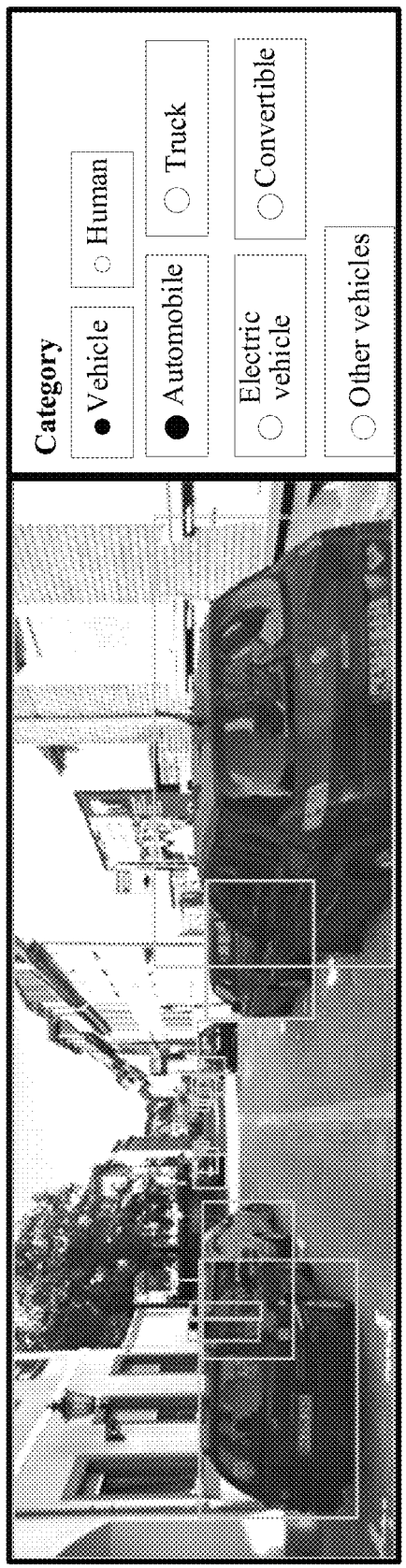
FIG. 7 is a schematic diagram of another image according to an embodiment of the present disclosure.

In an embodiment, annotation may be completed by using an annotation tool that meets the foregoing annotation rules. This is not specifically limited in this embodiment of the present disclosure. An interface of an annotation tool used for performing annotation may be shown in FIG. 7.

In an embodiment, a detailed process of annotation is as follows:

(1) Semantic Annotation

In one embodiment of the present disclosure, instances belong to special categories. In an embodiment, for a KINS dataset, a semantic label is an organized two-layer structure, which defines an inclusion relationship between general categories and sub-categories. That is, the semantic label is used for indicating a category of an instance.

Given that all images in the KINS dataset are streetscape images, two representative categories are selected as general categories, and eight representative categories are selected as sub-categories. The general category may include human and vehicle. Further, the general category of "human" is subdivided into three sub-categories: "pedestrian", "biker", and "seated person". The general category of "vehicle" is subdivided into five sub-categories: "automobile", "electric vehicle", "truck", "convertible", and "another vehicle". The another vehicle refers to other vehicles than the foregoing four types of vehicles.

(2) Relative Occlusion Order

In an embodiment, for each image, a senior annotator may annotate all instances in the image by using bounding boxes, and sort the instances to obtain a relative occlusion order.

For an order of occluded instances, the instances in the image are first divided into several clusters that are disconnected. Each cluster includes several connected instances, facilitating obtaining of an occlusion order by sorting. For example, in FIG. 3, an automobile on the left and an automobile on the right belong to two disconnected clusters.

In other words, the relative occlusion order is obtained based on a distance between each instance and a camera. A shorter distance between the instance and the camera indicates a higher probability that the instance is not occluded.

Figure 8:
FIG. 8 is a schematic diagram of another image according to an embodiment of the present disclosure.
Figure 9:
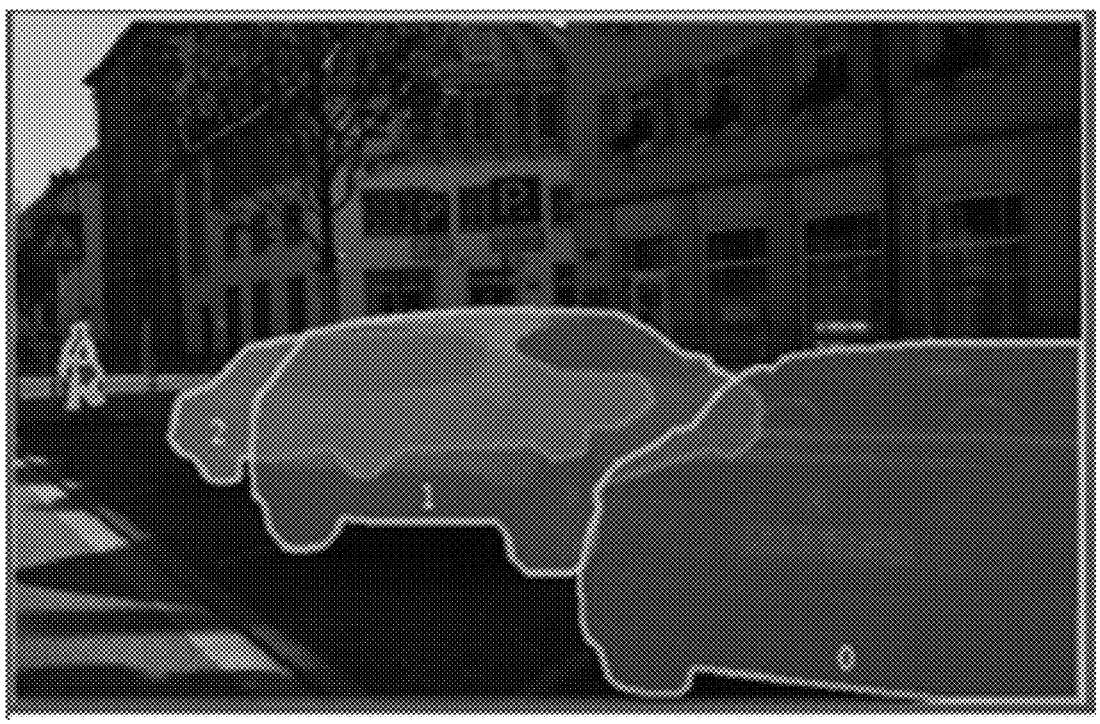
FIG. 9 is a schematic diagram of another image according to an embodiment of the present disclosure.
Figure 10:
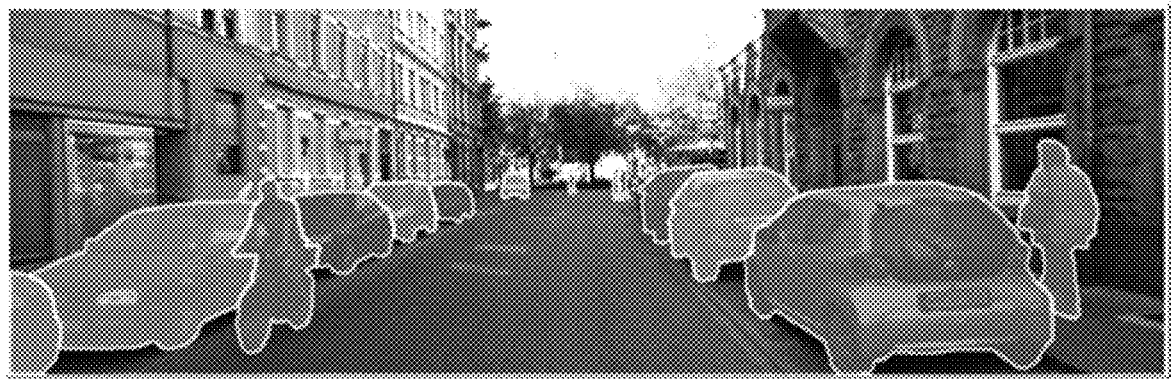
FIG. 10 is a schematic diagram of another image according to an embodiment of the present disclosure.
Figure 11:
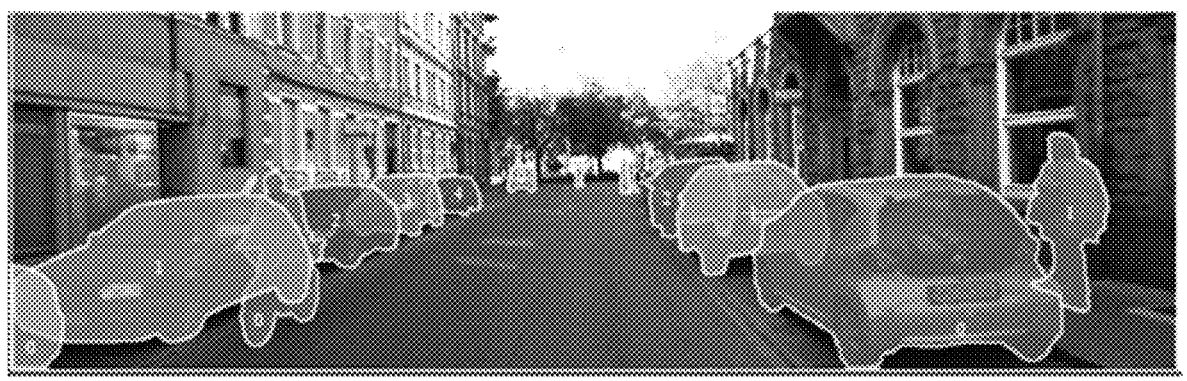
FIG. 11 is a schematic diagram of another image according to an embodiment of the present disclosure.
Figure 12:
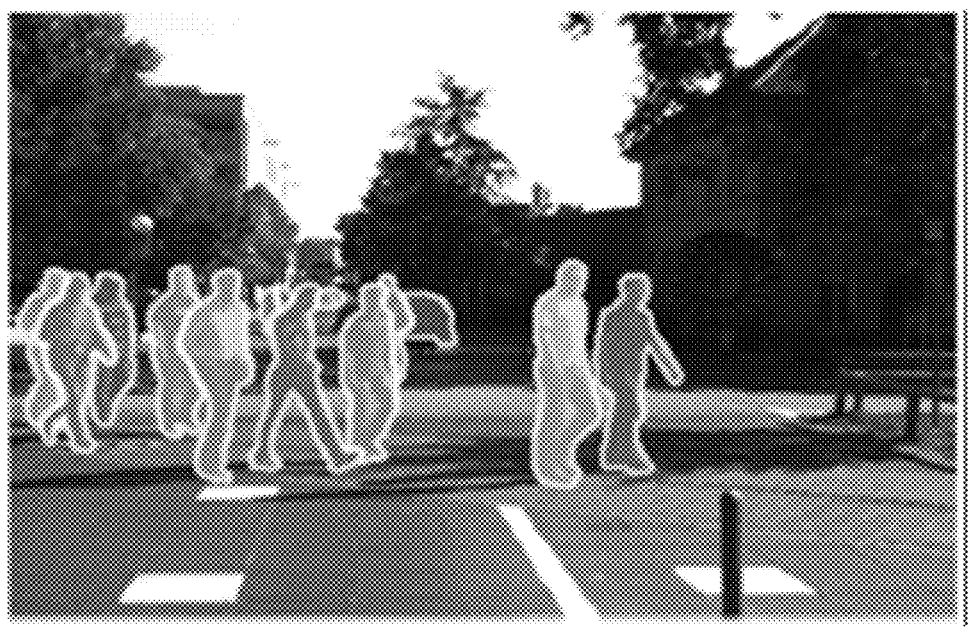
FIG. 12 is a schematic diagram of another image according to an embodiment of the present disclosure.
Figure 13:
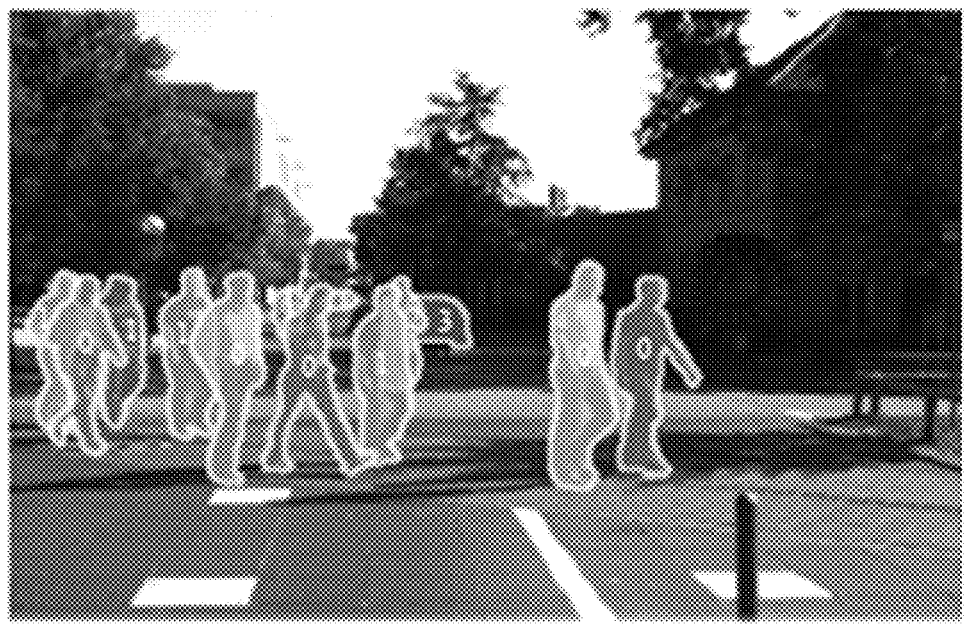
FIG. 13 is a schematic diagram of another image according to an embodiment of the present disclosure.

Referring to FIG. 8 to FIG. 13, instances in the same cluster are annotated in order starting from a close instance, that is, annotation is performed starting from an instance having a shortest distance from the camera. FIG. 8 corresponds to FIG. 9, FIG. 10 corresponds to FIG. 11, and FIG. 12 corresponds to FIG. 13. FIG. 8, FIG. 10, and FIG. 11 show streetscape images in which relative occlusion order annotation is not performed, and FIG. 9, FIG. 11, and FIG. 13 show streetscape images in which relative occlusion order annotation is performed.

In an embodiment, a relative occlusion order of a non-overlapped instance that is not occluded is marked as 0, and overlapped instances that are occluded in the cluster are marked from 1 in order. Every time occlusion occurs, a relative occlusion order increases by 1.

(3) Perspective Mask Annotation

In one embodiment of the present disclosure, N annotators perform perspective mask annotation on each instance in an image. In an embodiment, three annotators may mark a perspective mask of each instance in a bounding box corresponding to the each instance. A key point of this step is that the N annotators each infer a part of an instance that is occluded, and then determine a perspective mask of the instance based on masks of the same instance that are predicted by the N annotators. In an embodiment, perspective mask annotation for an instance is determined through majority voting of the N annotators.

Figure 14:
FIG. 14 is a schematic diagram of another image according to an embodiment of the present disclosure.
Figure 15:
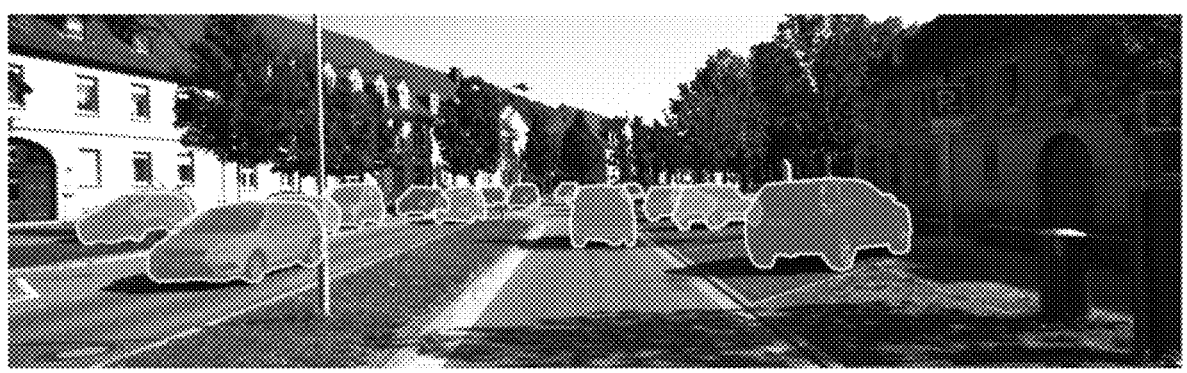
FIG. 15 is a schematic diagram of another image according to an embodiment of the present disclosure.

In an embodiment, FIG. 14 to FIG. 16 show a process of annotating instances of an image. FIG. 14 shows an original image that is not annotated, FIG. 15 shows a result of annotation by using perspective instance segmentation, and FIG. 16 shows a result of annotation by using a relative occlusion order. A lighter color indicates a higher probability that a corresponding instance is not occluded.

In an embodiment, the following steps may be performed to train a model based on the training dataset:

First, obtain training sample images, annotation information of each instance in the training sample images including: a relative occlusion order of the each instance, a semantic label used for indicating a category of the each instance, and a perspective mask of the each instance.

The training sample images refer to the images included in the training dataset.

Second, for occluded instances in the training sample images, determine non-perspective masks of the occluded instances based on relative occlusion orders and perspective masks of the occluded instances, and perform model training according to the training sample images annotated with the perspective masks, the non-perspective masks, and semantic labels, to obtain the target network.

Whether an instance is occluded by another instance or the instance occludes another instance can be inferred according to a relative occlusion order. If the instance is occluded by another instance, a quantity of instances that specifically occludes the instance can be further determined according to the relative occlusion order of the instance. In an embodiment, a non-perspective mask of the instance may be inferred according to a perspective mask of another instance and a perspective mask of the instance.

In one embodiment of the present disclosure, an initial network having a structure shown in FIG. 5 is trained based on the training sample images carrying the foregoing annotation information. A training process is a process of constantly optimizing a network parameter. In an embodiment, optimization may be performed by using a cross-entropy loss function. This is not specifically limited in this embodiment of the present disclosure. After the training is completed, the target network shown in FIG. 5 may be obtained. In addition, after the training is completed, the network may be tested based on test data, to check a prediction capability of the network.

The target network is trained based on the training sample images carrying the foregoing annotation information, so that the target network can not only accurately indicate perspective instance segmentation, but also determine category information, occlusion classification information, and the like of an instance. In particular, after model training is performed based on the training sample images, the obtained target network can accurately determine an invisible part of an instance in an image that is occluded. That is, the target network has a deduction capability similar to human vision, and can properly deduce perspective instance segmentation. Therefore, such an image processing manner has relatively good intelligence, and variety of image processing is enriched.

The image processing method provided in the embodiments of the present disclosure is described below in detail. Descriptions such as first, second, third, and fourth in the following embodiments are intended to merely distinguish different objects rather than constitute any other limitation such as an order.

FIG. 17 is a flowchart of an image processing method according to an embodiment of the present disclosure. Referring to FIG. 17, the method provided in one embodiment of the present disclosure is applied to an image processing device. The method specifically includes the following steps:

1701. Obtain an image, and perform feature extraction on the to-be-predicted image, to obtain a feature map of the to-be-predicted image.

In a self-driving scenario, the to-be-predicted image may be a streetscape image captured by a photographing device disposed on a self-driving vehicle. The streetscape image includes, but is not limited to: a vehicle, a person, trees at both side of a road, a traffic sign, and a billboard.

In an embodiment, referring to FIG. 5, a convolutional backbone structure may be used to perform feature extraction on the to-be-predicted image. The convolutional backbone structure may include a plurality of convolutional layers and a plurality of pooling layers. That is, after being inputted into the convolutional backbone structure, the to-be-predicted image is processed by using the plurality of convolutional layers and the plurality of pooling layers, to obtain a feature map of the entire image.

In addition, before the to-be-predicted image is inputted into the convolutional backbone structure, a pre-processing operation may be further performed on the to-be-predicted image. The pre-processing operation includes, but is not limited to, dimension adjustment and noise reduction. This is not specifically limited in this embodiment of the present disclosure.

1702. Generate at least one candidate region of the to-be-predicted image, and map the at least one candidate region to the feature map of the to-be-predicted image, one candidate region including one instance.

In one embodiment of the present disclosure, at least one candidate region of the to-be-predicted image may be generated based on a region generation network. In an embodiment, the region generation network may be a region proposal network (RPN). This is not specifically limited in this embodiment of the present disclosure.

The at least one candidate region refers to the remaining candidate region including an image foreground instance after filtering. In the self-driving scenario, the image foreground instance refers to a vehicle or a person belonging to an image foreground.

In an embodiment, the feature map of the to-be-predicted image is usually a feature map outputted by the last convolutional layer of the convolutional backbone structure, so that the at least one candidate region is mapped to the feature map. For example, each candidate region is mapped to a portion of the feature map that corresponds to the candidate region. Accordingly, for a candidate region, a corresponding region feature map may be obtained.

In addition, the at least one candidate region is also referred to as a region of interest (RoI) in this specification. This is also not specifically limited in this embodiment of the present disclosure.

1703. Process the mapped feature map based on a target network for instance segmentation, indicate an overall structure of an occluded instance in the to-be-predicted image by using a perspective mask, and indicate an invisible part of the occluded instance by using a non-perspective mask, the perspective mask and the non-perspective mask representing a relative occlusion relationship of the occluded instance.

In one embodiment of the present disclosure, the target network includes at least a first branch structure. In an embodiment, as shown in FIG. 5, the first branch structure refers to a perspective segmentation branch and a non-perspective segmentation branch. The first branch structure is also referred to as a Mask branch in this specification.

In another possible implementation, the target network further includes a second branch structure for determining occlusion classification information. The occlusion classification information is used for indicating that an instance is not occluded or is occluded. Referring to FIG. 5, the second branch structure refers to an occlusion classification branch.

In addition, the target network further includes a classification branch and a regression branch. In this specification, the classification branch and the regression branch are collectively referred to as a third branch structure or a detection box branch. The classification branch is responsible for performing classification on instances, and the regression branch is responsible for determining positions of the instances in the image.

In one embodiment of the present disclosure, referring to FIG. 5, after mapping of at least one candidate region is completed, pixel correction further needs to be performed on each RoI further by using an RoI Align layer.

RoI Align can resolve the problem of region mis-alignment caused by two times of quantization in an RoI pooling operation. An idea of RoI Align is: canceling a quantization operation, and obtaining image numerical values of pixel points with coordinates being floating point numbers by using a bilinear interpolation method, so as to convert the entire feature aggregation process into a continuous operation.

In an embodiment, a process of the RoI Align operation is: traversing all RoIs, and remaining bounds of floating point numbers without performing quantization. Each RoI is segmented into k*k units, and quantization is also not performed on a bound of each unit. Four fixed coordinate positions are calculated in each unit, values of the four positions are calculated by using the bilinear interpolation method, and then a max pooling operation is performed.

RoI Align realizes the following: first, a correspondence between pixels of the original to-be-predicted image and the feature map obtained after the feature extraction is established, and then a correspondence between the feature map and a feature map of fixed sizes/dimensions (e.g., length*width) is established. In other words, each RoI generates a feature map of fixed dimensions by using the RoI Align layer.

In one embodiment of the present disclosure, referring to FIG. 5, for each candidate region, a plurality of feature maps are obtained after pixel correction is performed on the candidate region. As shown in FIG. 5, for each RoI, a triangular symbol, a spindle symbol, and a hexagonal symbol in FIG. 5 each refer to a type of feature map.

To facilitate identification, a feature map corresponding to the hexagonal symbol in this specification is referred to as a first feature map, a feature map corresponding to the spindle symbol is referred to as a second feature map, and a feature map corresponding to the triangular symbol is referred to as a third feature map. As shown in FIG. 5, a size of the first feature map and a size of the second feature map are the same, and are less than a size of the third feature map. For example, the dimensions of the first feature map and the second feature map are 7*7, and the dimensions of the third feature map is 14*14.

In an embodiment, referring to FIG. 5, in one embodiment of the present disclosure, feature fusion is performed by using multi-branch coding during mask prediction. That is, feature fusion is performed on a feature (first feature map) of the occlusion classification branch, a feature (second feature map) of the detection box branch, and a feature (third feature map) used for mask prediction by using a multi-branch coding module shown in FIG. 5. This assists the Mask branch in deducing perspective instance segmentation by fusing features of the detection box branch, the occlusion classification branch, and the Mask branch.

Figure 18:
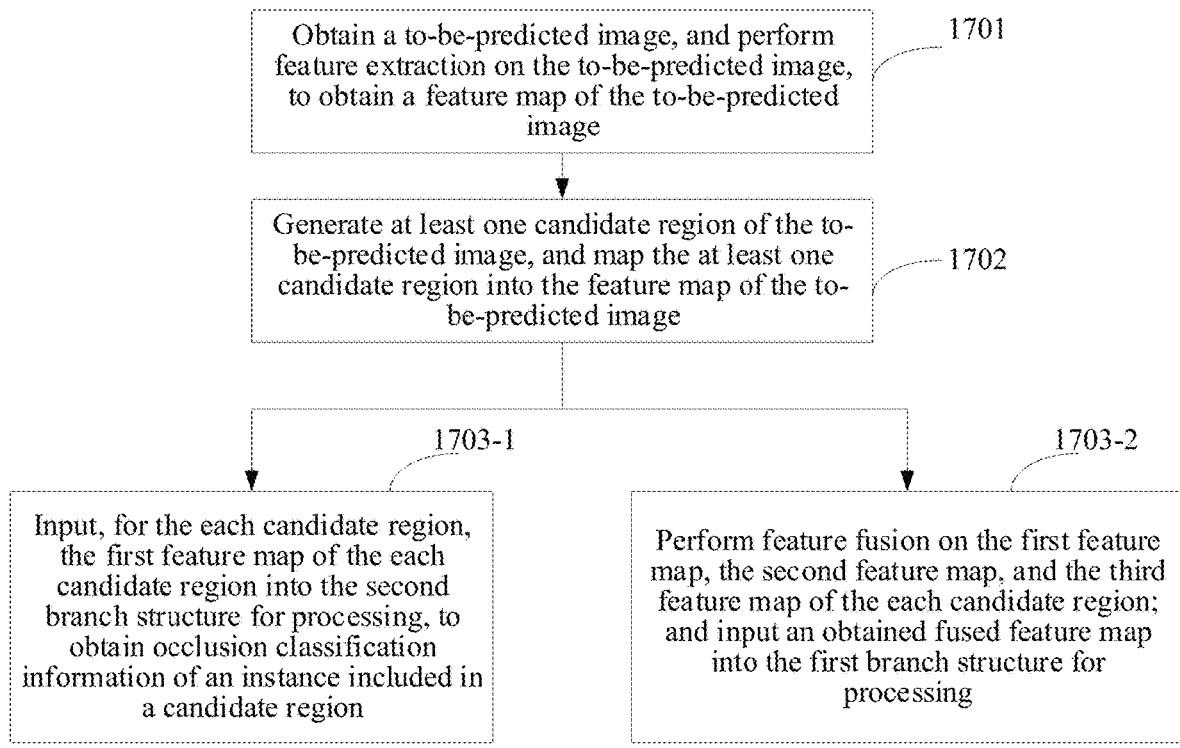
FIG. 18 is a flowchart of another image processing method according to an embodiment of the present disclosure.

In an embodiment, referring to FIG. 18, the processing the mapped feature map based on a target network for instance segmentation includes the following steps:

Step 1703-1. Input, for the each candidate region, the first feature map of the each candidate region into the second branch structure for processing, to obtain occlusion classification information of an instance included in a candidate region.

Step 1703-2. Perform feature fusion on the first feature map, the second feature map, and the third feature map of the each candidate region; and input an obtained fused feature map into the first branch structure for processing.

In the method provided in one embodiment of the present disclosure, after an image is obtained, feature extraction is first performed on the to-be-predicted image and at least one candidate region of the to-be-predicted image is generated. Then, the at least one candidate region is mapped into a feature map of the to-be-predicted image, one candidate region including one instance. Then, the mapped feature map is processed based on a target network, to indicate an overall structure of an instance by using a perspective mask and indicate an invisible part of the instance that is occluded by using a non-perspective mask. The target network processes the feature map, to obtain the perspective mask and the non-perspective mask of the instance. Therefore, in one embodiment of the present disclosure, not only the overall structure of the instance can be accurately determined, but also the invisible part of the instance that is occluded can be accurately determined. That is, the target network has a deduction capability similar to human vision, and can properly deduce perspective instance segmentation. Therefore, such an image processing manner has relatively good intelligence, and variety of image processing is enriched.

In addition, in one embodiment of the present disclosure, for the network structure, an occlusion classification branch is further added on the basis of a detection box branch and a Mask branch. The occlusion classification branch can effectively determine occlusion classification information of an instance, that is, the occlusion classification branch can effectively determine that an instance is occluded or is not occluded. Such an image processing manner has relatively good intelligence, and variety of image processing is enriched.

In addition, one embodiment of the present disclosure further proposes multi-feature fusion by using multi-branch coding. By using multi-branch fusion, the target network can better deduce an invisible part of an instance that is occluded. In other words, by using multi-feature fusion, the target network has a deduction capability similar to human vision, and can deduce the invisible part of the instance more properly.

To facilitate subsequent descriptions, a fully connected (FC) layer connected to the occlusion classification branch in FIG. 5 is referred to as a first FC layer, an FC layer connected to the classification branch is referred to as a second FC layer, and an FC layer connected to the regression branch is referred to as a third FC layer.

Detection Box Branch

Figure 19:
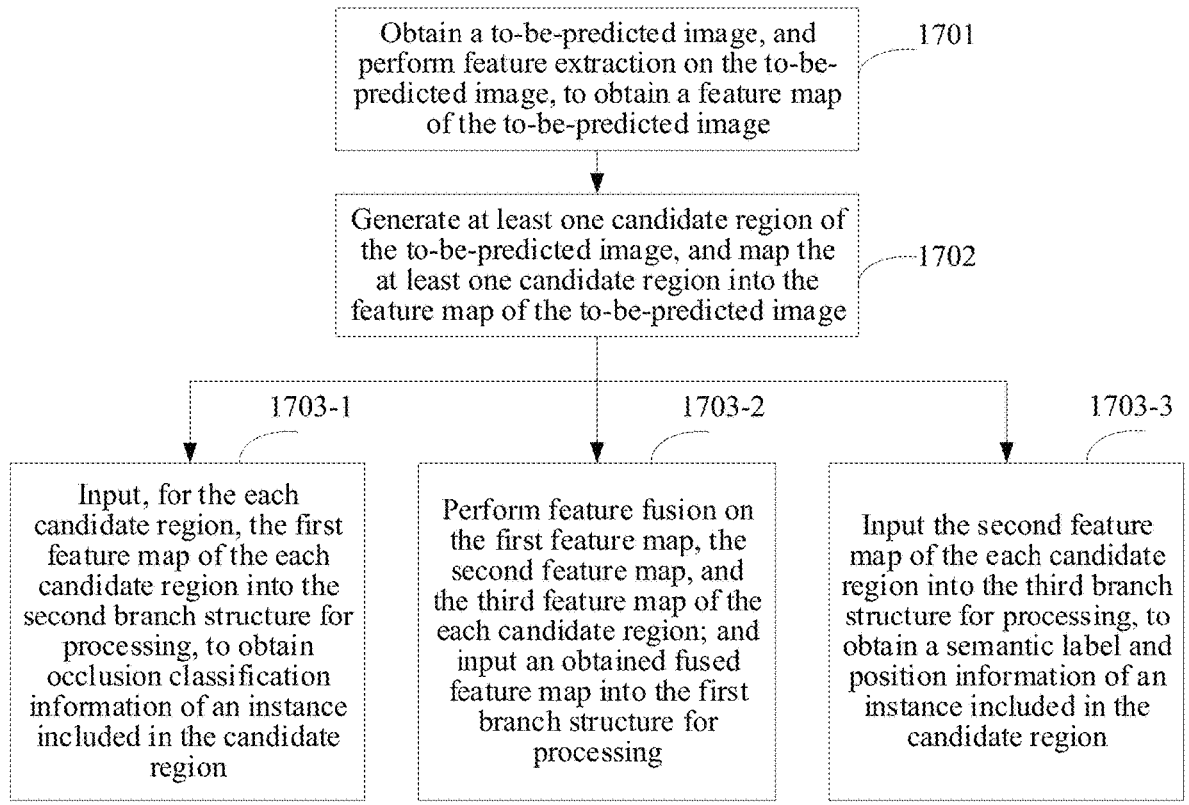
FIG. 19 is a flowchart of another image processing method according to an embodiment of the present disclosure.

In another embodiment, referring to FIG. 19, the processing the mapped feature map based on a target network further includes the following steps:

Step 1703-3. Input the second feature map of the each candidate region into the third branch structure for processing, to obtain a semantic label and position information of an instance included in a candidate region.

In an embodiment, referring to FIG. 5, the inputting the second feature map into the third branch structure for processing includes, but is not limited to: inputting the second feature map into the second FC layer for processing: inputting the second feature map processed in the second FC layer into a classification branch included in the third branch structure for processing, to obtain a semantic label of an instance included in a candidate region: inputting the second feature map into the third FC layer for processing; and inputting the second feature map processed in the third FC layer into a regression branch included in the third branch structure for processing, to obtain position information of the instance included in the candidate region. The position information may be an offset of a bounding box of the instance included in the candidate region. A bounding box of each instance is annotated during instance annotation, so that in one embodiment of the present disclosure, position information of the each instance can be predicted.

In the method provided in one embodiment of the present disclosure, the target network includes a detection box branch, an occlusion classification branch, and a Mask branch. By using the detection box branch, classification and positioning of an instance can be completed, that is, a category label of the instance and a specific position of the instance in the to-be-detected image are determined.

Occlusion Classification Branch

Generally, 512 candidate regions are sampled in the region generation network, only 128 candidate regions including an image foreground. Further, according to statistics in the training process, generally occlusion occurs in a maximum of 40 candidate regions among the 128 candidate regions including the image foreground, and most of occluded regions include only 1 to 10 pixels. Extreme imbalance between occlusion samples and de-occlusion samples significantly affects the quality of network training. In addition, after features of candidate regions are extracted, features of small regions are not obvious. Based on the foregoing, in one embodiment of the present disclosure, a candidate region whose occluded region has an area that is greater than an area of a bounding box by a preset percentage is selected as an occlusion sample. In an embodiment, a value of the preset percentage may be 5%. This is not specifically limited in this embodiment of the present disclosure.

Based on the foregoing descriptions, in an embodiment, in step 1703-1, the inputting the first feature map into the second branch structure for processing, to obtain occlusion classification information of an instance included in a candidate region includes, but is not limited to: determining, based on the second branch structure, whether an occluded area of the instance included in the candidate region reaches a target threshold; and determining, when the occluded area of the instance included in the candidate region reaches the target threshold, that the occlusion classification information indicates that the instance included in the candidate region is occluded. In addition, when the instance is occluded, a specific description of an occlusion situation, for example, a quantity of instances that are occluded and relative occlusion orders of the instances, may be further provided. This is not specifically limited in this embodiment of the present disclosure.

The target threshold may be 5% of the area of the bounding box. This is not specifically limited in this embodiment of the present disclosure.

In an embodiment, referring to FIG. 5, before the first feature map is inputted into the second branch structure for processing, the first feature map may be first inputted into the first FC layer for processing. Then, the first feature map processed in the first FC layer is inputted into the second branch structure for processing.

In an embodiment, a structure of the occlusion classification branch is consistent with a structure of the classification branch in the detection box branch, that is, binary classification of occluded and not occluded is performed only in the last layer. In an embodiment, the classification branch includes four convolutional layers and one FC layer. The occlusion classification branch also includes four convolutional layers and one FC layer, and further includes one binary classification softmax layer.

In the method provided in one embodiment of the present disclosure, a target network includes a detection box branch, an occlusion classification branch, and a Mask branch. By using the occlusion classification branch, occlusion classification information of an instance can be effectively determined, that is, whether the instance is occluded or not occluded can be effectively determined.

Multi-Branch Feature Fusion

By using the occlusion classification branch, the target network may extract effective occlusion features. In one embodiment of the present disclosure, to further improve a capability of the target network for predicting a perspective mask or a non-perspective mask, one embodiment of the present disclosure further proposes a multi-branch coding module to perform feature fusion, so as to enlarge global information in mask prediction. The Mask branch intends to perform refined pixel-level mask prediction. Feature information of the detection box branch and the occlusion classification branch may be used as global guidance information to guide the Mask branch.

In an embodiment, a structure of the multi-branch coding module is shown in FIG. 6. First, the feature information of the occlusion classification branch and the feature information of the detection box branch are concatenated (CONCAT) and then are further fused, involving one deconvolutional (DECONV) layer and two convolutional (CONV) layers. Then, the fused feature information and the feature information of the Mask branch are concatenated and then fused, involving three convolutional layers. The finally fused feature information is used for predicting a perspective mask or a non-perspective mask.

It may be learned based on the foregoing descriptions that in an embodiment, in step 1703-2, the performing feature fusion on the first feature map, the second feature map, and the third feature map includes, but is not limited to:

performing concatenation on the first feature map and the second feature map, to obtain a first intermediate feature map: processing the first intermediate feature map by using one deconvolutional layer and two convolutional layers in sequence, to obtain a second intermediate feature map; and performing concatenation on the second intermediate feature map and the third feature map, to obtain a third intermediate feature map, and processing the third intermediate feature map by using three convolutional layers in sequence, to obtain the fused feature map.

The fused feature map corresponds to a pentagon symbol shown in FIG. 6. A convolutional operation remains a spatial dimension of a feature, but a deconvolutional operation increases a spatial dimension of a feature.

In addition, in step 1703-2, the inputting an obtained fused feature map into the first branch structure, to obtain an invisible part of an instance included in a candidate region that is occluded includes, but is not limited to:

Step a. Input the fused feature map into a first deconvolutional layer for processing, to obtain a first processed feature map.

This step is to increase a spatial dimension of a feature, that is, to improve resolution, by using a deconvolutional operation.

Step b. Input the first processed feature map into a first mask branch included in the first branch structure, and obtain, when an instance included in the candidate region is an occluded instance, a non-perspective mask of the instance included in the candidate region.

An invisible part of the instance included in the candidate region that is occluded may be determined based on the non-perspective mask.

In another possible implementation, the method provided in the embodiments of the present disclosure further includes:

Step c. Input the fused feature map into a second deconvolutional layer for processing, to obtain a second processed feature map.

Step d. Input the second processed feature map into a second mask branch included in the first branch structure, to obtain a perspective mask of the instance included in the candidate region.

An overall structure of the instance included in the candidate region may be determined based on the perspective mask. The overall structure includes a visible part and an invisible part.

In an embodiment, a structure of the Mask branch is consistent with a structure of the classification branch in the detection box branch. For example, a perspective segmentation branch and a non-perspective segmentation branch in the Mask branch each include four convolutional layers. This is not specifically limited in this embodiment of the present disclosure.

In the method provided in one embodiment of the present disclosure, by using multi-branch fusion, the target network can better deduce perspective instance segmentation.

In another embodiment, an application scenario of the image processing method provided in one embodiment of the present disclosure includes, but is not limited to, the following two examples:

Example 1: Perspective instance segmentation provided in one embodiment of the present disclosure is applicable to a self-driving scenario.

In this scenario, when a self-driving vehicle is driving, a camera mounted on the self-driving vehicle may capture streetscape images shown in FIG. 8, FIG. 10, FIG. 12, and FIG. 13 in real time. The captured streetscape images may include a moving vehicle, a static vehicle, a pedestrian, and a biker. Limited by a range of a field of view, some instances in the current streetscape images may be occluded by other instances. Because the occluded part is invisible, that is, unreachable by sight, self-driving may be adversely affected. For example, the self-driving vehicle fails to avoid an occluded instance in time.

The perspective instance segmentation task provided in one embodiment of the present disclosure may assist a self-driving system in performing an accurate driving control strategy. For example, based on perspective instance segmentation, when obtaining a visible part of an occluded instance in a streetscape image, the self-driving system can further deduce an invisible part of the instance based on the visible part, that is, obtaining an overall structure of the instance. In this way, occurrence of detection signal jitter in the self-driving system can be effectively reduced, and the self-driving vehicle can accurately perform the driving control strategy according to a current road condition.

Example 2: Perspective instance segmentation provided in one embodiment of the present disclosure is further applicable to a photographing scenario or a download scenario.

Figure 20:
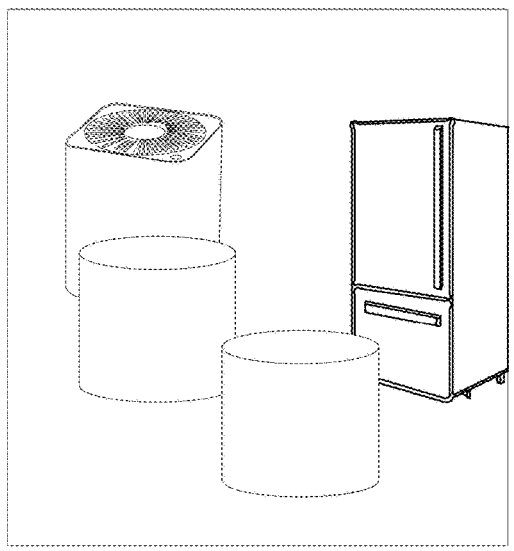
FIG. 20 is a schematic diagram of another image according to an embodiment of the present disclosure.

In an embodiment, the photographing scenario may be a photographing scenario in which an intelligent robot executes a task. That is, the perspective instance segmentation task provided in one embodiment of the present disclosure is alternatively applicable to an intelligent robot scenario. For example, the intelligent robot executes a clean task. A camera disposed on the intelligent robot may capture front images in real time. The captured images may include obstacles affecting movement of the intelligent robot, which is similar to occlusion shown in FIG. 8, FIG. 10, FIG. 12, and FIG. 13. Referring to FIG. 20, some obstacles in the captured images may be occluded by other obstacles. Because the occluded part is invisible, that is, unreachable by sight, execution of the clean task by the intelligent robot may be adversely affected. However, the perspective instance segmentation task provided in one embodiment of the present disclosure may infer an invisible part that is occluded based on a visible part of an instance, which effectively assists the intelligent robot in completing the clean task.

For the download scenario, some persons or objects in a downloaded image may be occluded by other persons or objects. Alternatively, limited by the network, the downloaded image may include only a part of effective information, and other information is lost. In most cases, a user wants to view a complete target. The perspective instance segmentation task provided in one embodiment of the present disclosure may infer, based on a visible part of an instance, an invisible part of the instance, to help the user view the complete target.

In other words, the image processing method provided in one embodiment of the present disclosure performs well in a target with a highly semantic structure that is included in a natural image.

In conclusion, the foregoing image processing method can be applied to various application scenarios. The method is applicable to other scenarios than the foregoing two scenarios as long as training data of different types is provided for training.

Figure 21:
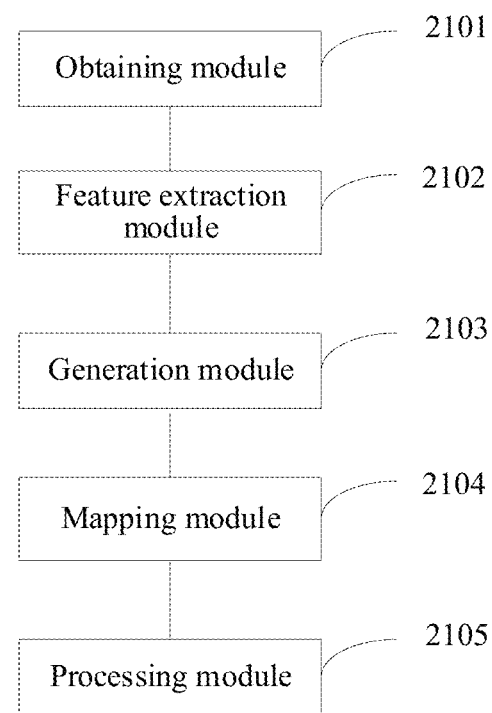
FIG. 21 is a schematic structural diagram of an image processing apparatus according to an embodiment of the present disclosure.

It is to be understood that, although the steps are displayed sequentially according to the instructions of the arrows in the flowcharts of the embodiments, these steps are not necessarily performed sequentially according to the sequence instructed by the arrows. Unless otherwise explicitly specified in the present disclosure, execution of the steps is not strictly limited, and the steps may be performed in other sequences. In addition, at least some of the steps in each embodiment may include a plurality of sub-steps or a plurality of stages. The sub-steps or stages are not necessarily performed at the same moment. Instead, they may be performed at different moments. The sub-steps or stages are not necessarily sequentially performed. Instead, they may be performed in turn or alternately with at least some of other steps or sub-steps or stages of other steps. FIG. 21 is a schematic structural diagram of an image processing apparatus according to an embodiment of the present disclosure. The apparatus may be disposed on the image processing device in the foregoing embodiment. Referring to FIG. 21, the apparatus includes:

an obtaining module 2101, configured to obtain an image;

a feature extraction module 2102, configured to perform feature extraction on the to-be-predicted image, to obtain a feature map of the to-be-predicted image;

a generation module 2103, configured to generate at least one candidate region of the to-be-predicted image;

a mapping module 2104, configured to map the at least one candidate region to/with the feature map of the to-be-predicted image, one candidate region including one instance; and a processing module 2105, configured to process the mapped feature map based on a target network, indicate an overall structure of an occluded instance in the to-be-predicted image by using a perspective mask, and indicate an invisible part of the occluded instance by using a non-perspective mask, the perspective mask and the non-perspective mask representing a relative occlusion relationship of the occluded instance.

In the apparatus provided in one embodiment of the present disclosure, after an image is obtained, feature extraction is first performed on the to-be-predicted image and at least one candidate region of the to-be-predicted image is generated. Then, the at least one candidate region is mapped into a feature map of the to-be-predicted image, one candidate region including one instance. Next, the mapped feature map is processed based on a target network, to indicate an overall structure of an instance by using a perspective mask and indicate an invisible part of the instance that is occluded by using a non-perspective mask. The target network processes the feature map, to obtain the perspective mask and the non-perspective mask of the instance. Therefore, in one embodiment of the present disclosure, not only the overall structure of the instance can be accurately determined, but also the invisible part of the instance that is occluded can be accurately determined. That is, the target network has a deduction capability similar to human vision, and can properly deduce perspective instance segmentation. Therefore, such an image processing manner has relatively good intelligence, and variety of image processing is enriched.

In an embodiment, the processing module 2105 is further configured to perform pixel correction on each candidate region, to obtain a feature map of the each candidate region.

The feature map of the each candidate region includes a first feature map, a second feature map, and a third feature map, and a size of the first feature map and a size of the second feature map are the same and being less than a size of the third feature map.

In an embodiment, the processing module 2105 is further configured to perform, for the each candidate region, feature fusion on the first feature map, the second feature map, and the third feature map; and input an obtained fused feature map into a first branch structure of the target network for processing.

In an embodiment, the target network further includes a second branch structure, and the processing module 2105 is further configured to input, for the each candidate region, the first feature map into the second branch structure for processing, to obtain occlusion classification information of an instance included in a candidate region.

In an embodiment, the target network further includes a third branch structure, and the processing module 2105 is further configured to input, for the each candidate region, the second feature map into the third branch structure for processing, to obtain a semantic label and position information of an instance included in the candidate region.

In an embodiment, the processing module 2105 is further configured to perform concatenation on the first feature map and the second feature map, to obtain a first intermediate feature map; process the first intermediate feature map by using one deconvolutional layer and two convolutional layers in sequence, to obtain a second intermediate feature map; and perform concatenation on the second intermediate feature map and the third feature map, to obtain a third intermediate feature map, and process the third intermediate feature map by using three convolutional layers in sequence, to obtain the fused feature map.

In an embodiment, the processing module 2105 is further configured to input the fused feature map into a first deconvolutional layer for processing, to obtain a first processed feature map; and input the first processed feature map into a first mask branch included in the first branch structure, and obtain, when an instance included in a candidate region is an occluded instance, a non-perspective mask of the instance included in the candidate region.

In an embodiment, the processing module 2105 is further configured to input the fused feature map into a second deconvolutional layer for processing, to obtain a second processed feature map; and input the second processed feature map into a second mask branch included in the first branch structure, to obtain a perspective mask of the instance included in the candidate region.

In an embodiment, the processing module 2105 is further configured to determine, based on the second branch structure, whether an occluded area of the instance included in the candidate region reaches a target threshold; and determine, when the occluded area of the instance included in the candidate region reaches the target threshold, that the occlusion classification information indicates that the instance included in the candidate region is occluded.

In an embodiment, the processing module 2105 is further configured to input the first feature map into a first FC layer for processing; and input the first feature map processed in the first FC layer into the second branch structure for processing.

In an embodiment, the processing module 2105 is further configured to input the second feature map into a second FC layer for processing: input the second feature map processed in the second FC layer into a classification branch included in the third branch structure for processing, to obtain classification information; input the second feature map into a third FC layer for processing; and input the second feature map processed in the third FC layer into a regression branch included in the third branch structure for processing, to obtain the position information.

In an embodiment, the apparatus further includes:

a training module, configured to obtain training sample images, annotation information of each instance in the training sample images including at least a semantic label used for indicating a category, a relative occlusion order, and a perspective mask; determine, based on relative occlusion orders and perspective masks of occluded instances in the training sample images, non-perspective masks of the occluded instances in the training sample images; and perform model training according to the training sample images annotated with the perspective masks, the non-perspective masks, and semantic labels, to obtain the target network.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Any combination of the foregoing optional technical solutions may be used to form an optional embodiment of the present disclosure. Details are not described herein again.

When the image processing apparatus processes images, the foregoing embodiment is merely described by using an example of dividing various functional modules. In actual application, the foregoing function allocation is completed by different functional modules according to needs, that is, the internal structure of the apparatus is divided into different functional modules, to complete all or some of functions described above. In addition, the image processing apparatus provided in the foregoing embodiment belongs to the same idea as the image processing method. See the method embodiment for a specific implementation process thereof, and details are not described herein again.

Figure 22:
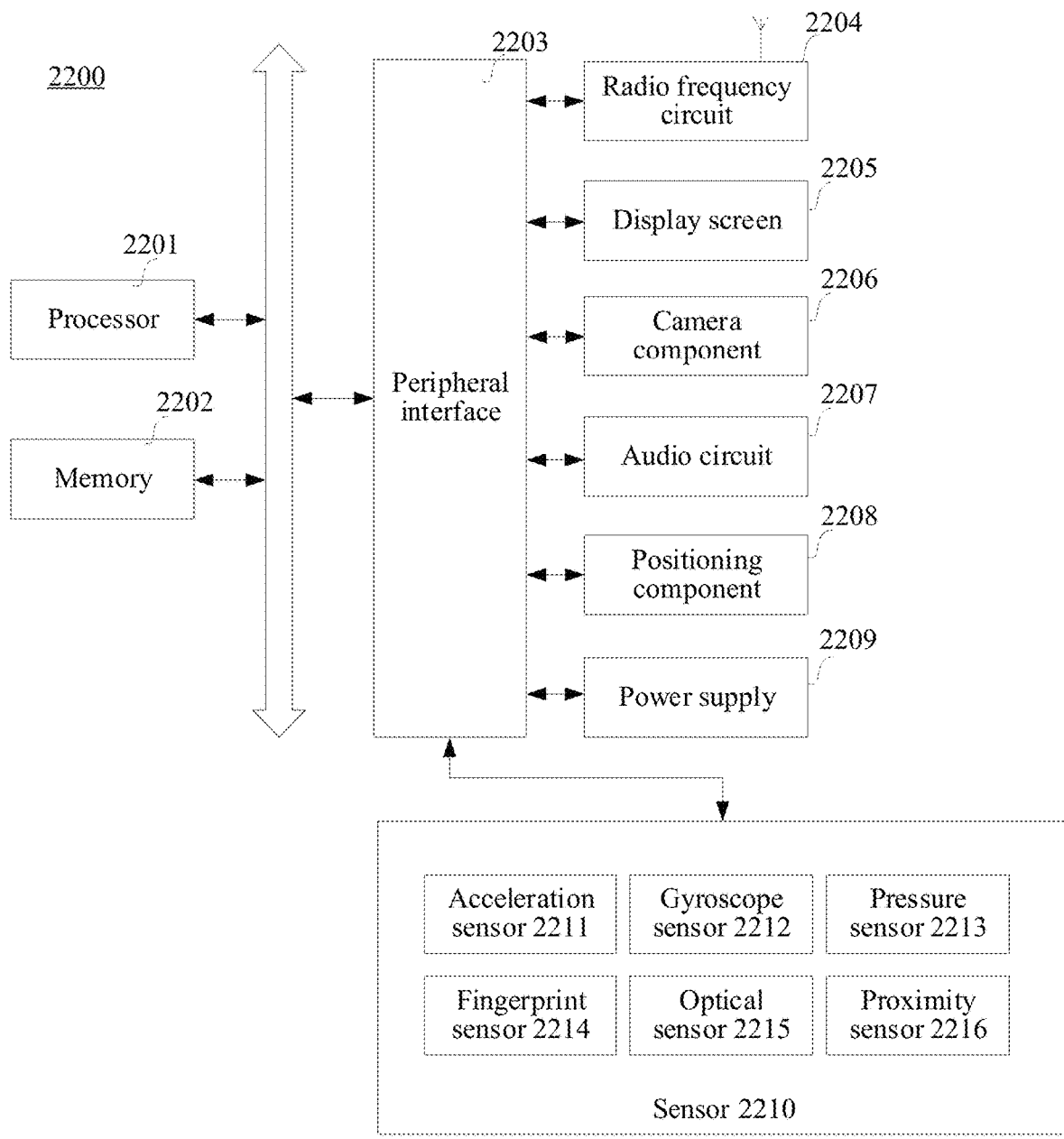
FIG. 22 is a schematic structural diagram of an image processing device according to an embodiment of the present disclosure.

FIG. 22 is a structural block diagram of an image processing device 2200 according to an exemplary embodiment of the present disclosure. The device 2200 may be a portable mobile terminal, for example, a smartphone, a tablet computer, a Moving Picture Experts Group Audio Layer III (MP3) player, a Moving Picture Experts Group Audio Layer IV (MP4) player, a notebook computer, or a desktop computer. The device 2200 may also be referred to as user equipment, a portable terminal, a laptop terminal, a desktop terminal, or another name.

Generally, the device 2200 includes a processor 2201 and a memory 2202.

The processor 2201 may include one or more processing cores, and may be, for example, a 4-core processor or an 8-core processor. The processor 2201 may be implemented in at least one hardware form of digital signal processor (DSP), a field-programmable gate array (FPGA), and a programmable logic array (PLA). The processor 2201 may alternatively include a main processor and a coprocessor. The main processor is configured to process data in an active state, also referred to as a central processing unit (CPU). The coprocessor is a low-power processor configured to process data in a standby state. In some embodiments, a graphics processing unit (GPU) may be integrated into the processor 2201. The GPU is configured to be responsible for rendering and drawing content to be displayed on a display screen. In some embodiments, the processor 2201 may further include an AI processor. The AI processor is configured to process a computing operation related to machine learning.

The memory 2202 may include one or more computer-readable storage media. The computer-readable storage medium may be non-transient. The memory 2202 may further include a high-speed random access memory (RAM), and a non-volatile memory such as one or more magnetic disk storage devices and a flash storage device. In some embodiments, the non-transient computer-readable storage medium in the memory 2202 is configured to store at least one computer-readable instruction, and the at least one computer-readable instruction is configured to be executed by the processor 2201 to implement the image processing method provided in the method embodiments of the present disclosure.

In some embodiments, the device 2200 may further include a peripheral interface 2203 and at least one peripheral. The processor 2201, the memory 2202, and the peripheral interface 2203 may be connected by using a bus or a signal cable. Each peripheral may be connected to the peripheral interface 2203 by using a bus, a signal cable, or a circuit board. Specifically, the peripheral includes: at least one of a radio frequency (RF) circuit 2204, a touch display screen 2205, a camera component 2206, an audio circuit 2207, a positioning component 2208, and a power supply 2209.

The peripheral interface 2203 may be configured to connect at least one peripheral related to input/output (I/O) to the processor 2201 and the memory 2202. In some embodiments, the processor 2201, the memory 2202, and the peripheral interface 2203 are integrated into the same chip or circuit board. In some other embodiments, any or both of the processor 2201, the memory 2202, and the peripheral interface 2203 may be implemented on an independent chip or circuit board. This is not limited in this embodiment.

The RF circuit 2204 is configured to receive and transmit an RF signal, which is also referred to as an electromagnetic signal. The RF circuit 2204 communicates with a communication network and another communication device by using the electromagnetic signal. The RF circuit 2204 converts an electric signal into an electromagnetic signal for transmission, or converts a received electromagnetic signal into an electric signal.

The display screen 2205 is configured to display a user interface (UI). The UI may include a graph, text, an icon, a video, and any combination thereof. When the display screen 2205 is a touch display screen, the display screen 2205 is further capable of collecting a touch signal on or above a surface of the display screen 2205. The touch signal may be inputted into the processor 2201 as a control signal for processing. In this case, the display screen 2205 may be further configured to provide a virtual button and/or a virtual keyboard that are/is also referred to as a soft button and/or a soft keyboard. In some embodiments, there may be one display screen 2205, disposed on a front panel of the device 2200. In some other embodiments, there are at least two display screens 2205, disposed on different surfaces of the device 2200 respectively or in a folded design. In still other embodiments, the display screen 2205 may be a flexible display screen, disposed on a curved surface or a folded surface of the device 2200. The display screen 2205 may be further set to have a non-rectangular irregular graph, that is, a special-shaped screen. The display screen 2205 may be prepared by using materials such as a liquid-crystal display (LCD), an organic light-emitting diode (OLED), or the like.

The camera component 2206 is configured to collect images or videos. In one embodiment, the camera component 2206 includes a front-facing camera and a rear-facing camera. Generally, the front-facing camera is disposed on the front panel of the terminal, and the rear-facing camera is disposed on a back surface of the terminal. In some embodiments, there are at least two rear cameras, which are respectively any of a main camera, a depth-of-field camera, a wide-angle camera, and a telephoto camera, to achieve background blur through fusion of the main camera and the depth-of-field camera, panoramic photographing and virtual reality (VR) photographing through fusion of the main camera and the wide-angle camera, or other fusion photographing functions.

The audio circuit 2207 may include a microphone and a speaker. The microphone is configured to collect sound waves of users and surroundings, and convert the sound waves into electrical signals and input the signals to the processor 2201 for processing, or input the signals into the radio frequency circuit 2204 to implement voice communication. For the purpose of stereo sound collection or noise reduction, there may be a plurality of microphones, respectively disposed at different parts of the device 2200.

The positioning component 2208 is configured to position a current geographic location of the device 2200, to implement a navigation or a location-based service (LBS).

The power supply 2209 is configured to supply power to components in the device 2200.

In some embodiments, the device 2200 further includes one or more sensors 2210. The one or more sensors 2210 include, but are not limited to, an acceleration sensor 2211, a gyroscope sensor 2212, a pressure sensor 2213, a fingerprint sensor 2214, an optical sensor 2215, and a proximity sensor 2216.

The acceleration sensor 2211 may detect acceleration on three coordinate axes of a coordinate system established by the device 2200.

The gyroscope sensor 2212 may detect a body direction and a rotation angle of the device 2200. The gyroscope sensor 2212 may cooperate with the acceleration sensor 2211 to collect a 3D action performed by the user on the device 2200.

The pressure sensor 2213 may be disposed on a side frame of the device 2200 and/or a lower layer of the touch display screen 2205.

The fingerprint sensor 2214 is configured to collect a fingerprint of a user, and the processor 2201 recognizes an identity of the user according to the fingerprint collected by the fingerprint sensor 2214, or the fingerprint sensor 2214 recognizes the identity of the user based on the collected fingerprint.

The optical sensor 2215 is configured to collect ambient light intensity.

The proximity sensor 2216, also referred to as a distance sensor, is usually disposed on the front panel of the device 2200. The proximity sensor 2216 is configured to collect a distance between the user and the front of the device 2200.

A person skilled in the art may understand that the structure shown in FIG. 22 does not constitute a limitation to the device 2200, and the device may include more components or fewer components than those shown in the figure, or some components may be combined, or a different component deployment may be used.

Figure 23:
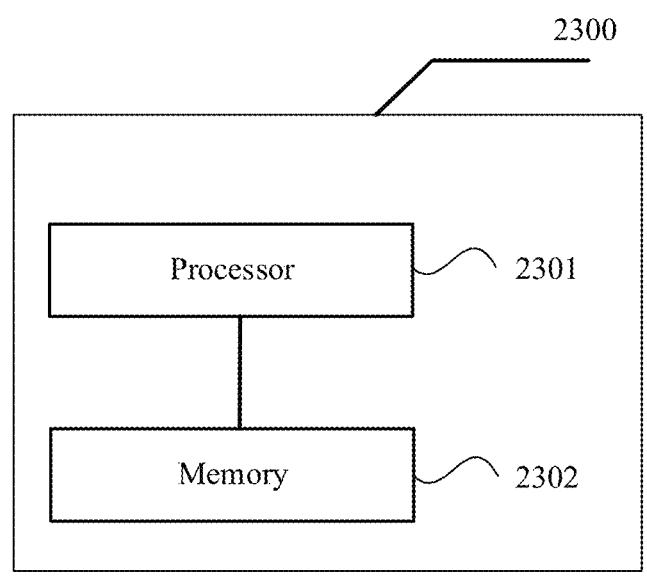
FIG. 23 is a schematic structural diagram of an image processing device according to an embodiment of the present disclosure.

FIG. 23 is a schematic structural diagram of an image processing device according to an embodiment of the present disclosure. The device 2300 may vary greatly due to different configurations or performance, and may include one or more processors (CPUs) 2301 and one or more memories 2302. The memory 2302 stores at least one computer-readable instruction, the at least one computer-readable instruction being loaded and executed by the processor 2301 to implement the image processing method provided in the foregoing method embodiments. Certainly, the device can also have a wired or wireless network interface, a keyboard, an I/O interface and other components to facilitate I/O. The device can also include other components for implementing device functions. Details are not described herein again.

In an exemplary embodiment, a computer-readable storage medium, for example, a memory including computer-readable instructions, is further provided. The computer-readable instructions may be executed by the processor in the terminal to implement the image processing method in the foregoing embodiment. For example, the computer-readable storage medium may be a ROM, a RAM, a CD-ROM, a magnetic tape, a floppy disk, or an optical data storage device.

A person of ordinary skill in the art may understand that all or some of the steps of the foregoing embodiments may be implemented by using hardware, or may be implemented by a program instructing relevant hardware. The program may be stored in a computer-readable storage medium. The above-mentioned storage medium may be a read-only memory, a magnetic disk, an optical disc, or the like.

The foregoing descriptions are merely exemplary embodiments of the present disclosure, but are not intended to limit the present disclosure. Any modification, equivalent replacement, or improvement and the like made within the spirit and principle of the present disclosure fall within the protection scope of the present disclosure.

What is claimed is:

1. An image processing method, performed by an image processing device, comprising:
   obtaining an image, and performing feature extraction on the image, to obtain a feature map of the image;
   generating at least one candidate region of the image, and mapping the at least one candidate region to the feature map of the image, each candidate region comprising one instance;
   processing the mapped feature map based on a target network for instance segmentation; and
   indicating an overall structure of an occluded instance in the image by using a perspective mask, and indicating an invisible part of the occluded instance by using a non-perspective mask, the perspective mask and the non-perspective mask representing a relative occlusion relationship of the occluded instance, wherein:
   the target network comprises a first branch structure configured to obtain the non-perspective mask and the perspective mask, a second branch structure configured to output occlusion classification information of an instance comprised in the candidate region, and a third branch configured to output a semantic label and position information of the instance in the image; and
   processing the mapped feature map based on the target network for instance segmentation comprises: fusing feature information output by the second branch structure, feature information output by the third branch structure, and feature information corresponding to the first branch structure to obtain fused feature information; and applying the fused feature information in the first branch structure to obtain the perspective mask and the non-perspective mask.

2. The method according to claim 1, wherein after the mapping the at least one candidate region to the feature map of the image, the method further comprises:
   performing pixel correction on each candidate region, to obtain a feature map of the each candidate region,
   the feature map of the each candidate region comprising a first feature map, a second feature map, and a third feature map, a size of the first feature map and a size of the second feature map being the same and being less than a size of the third feature map.

3. The method according to claim 2, wherein the processing the mapped feature map based on a target network for instance segmentation comprises:
   performing, for the each candidate region, feature fusion on the first feature map, the second feature map, and the third feature map; and
   inputting an obtained fused feature map into the first branch structure of the target network for processing.

4. The method according to claim 3, wherein the performing feature fusion on the first feature map, the second feature map, and the third feature map comprises:
   performing concatenation on the first feature map and the second feature map, to obtain a first intermediate feature map;

processing the first intermediate feature map by using one deconvolutional layer and two convolutional layers in sequence, to obtain a second intermediate feature map; and performing concatenation on the second intermediate feature map and the third feature map, to obtain a third intermediate feature map, and processing the third intermediate feature map by using three convolutional layers in sequence, to obtain the fused feature map.

5. The method according to claim 3, wherein the inputting an obtained fused feature map into a first branch structure of the target network for processing comprises:

inputting the fused feature map into a first deconvolutional layer for processing, to obtain a first processed feature map; and inputting the first processed feature map into a first mask branch comprised in the first branch structure, and obtaining, when an instance comprised in a candidate region is an occluded instance, a non-perspective mask of the instance comprised in the candidate region.

6. The method according to claim 5, wherein the inputting an obtained fused feature map into a first branch structure of the target network for processing further comprises:

inputting the fused feature map into a second deconvolutional layer for processing, to obtain a second processed feature map; and inputting the second processed feature map into a second mask branch comprised in the first branch structure, to obtain a perspective mask of the instance comprised in the candidate region.

7. The method according to claim 2, wherein the method further comprises:

inputting, for the each candidate region, the first feature map into the second branch structure for processing, to obtain the occlusion classification information of the instance comprised in the candidate region.

8. The method according to claim 7, wherein the inputting the first feature map into the second branch structure for processing, to obtain occlusion classification information of an instance comprised in the candidate region comprises:

determining, based on the second branch structure and the first feature map, whether an occluded area of the instance comprised in the candidate region reaches a target threshold; and determining, when the occluded area of the instance comprised in the candidate region reaches the target threshold, that the occlusion classification information indicates that the instance comprised in the candidate region is occluded.

9. The method according to claim 7, wherein the inputting the first feature map into the second branch structure for processing comprises:

inputting the first feature map into a first fully connected layer for processing; and inputting the first feature map processed in the first fully connected layer into the second branch structure for processing.

10. The method according to claim 2, wherein the method further comprises:

inputting, for the each candidate region, the second feature map into the third branch structure for processing, to obtain the semantic label and the position information of the instance comprised in the candidate region.

11. The method according to claim 10, wherein the inputting the second feature map into the third branch structure for processing comprises:

inputting the second feature map into a second fully connected layer for processing;

inputting the second feature map processed in the second fully connected layer into a classification branch comprised in the third branch structure for processing, to obtain classification information;

inputting the second feature map into a third fully connected layer for processing; and inputting the second feature map processed in the third fully connected layer into a regression branch comprised in the third branch structure for processing, to obtain the position information.

12. The method according to claim 1, further comprising:

obtaining training sample images, annotation information of each instance in the training sample images comprising at least a semantic label used for indicating a category, a relative occlusion order, and a perspective mask;

determining, based on relative occlusion orders and perspective masks of occluded instances in the training sample images, non-perspective masks of the occluded instances in the training sample images; and performing model training according to the training sample images annotated with the perspective masks, the non-perspective masks, and semantic labels, to obtain the target network.

13. An image processing apparatus, comprising one or more processors and a memory, the memory storing at least one computer-readable instruction, the at least one computer-readable instruction being loaded and executed by the one or more processors to:

obtain an image;

perform feature extraction on the image, to obtain a feature map of the image;

generate at least one candidate region of the image;

map the at least one candidate region to the feature map of the image, each candidate region comprising one instance; and process the mapped feature map based on a target network for instance segmentation, indicate an overall structure of an occluded instance in the image by using a perspective mask, and indicate an invisible part of the occluded instance by using a non-perspective mask, the perspective mask and the non-perspective mask representing a relative occlusion relationship of the occluded instance, wherein:

the target network comprises a first branch structure configured to obtain the non-perspective mask and the perspective mask, a second branch structure configured to output occlusion classification information of an instance comprised in the candidate region, and a third branch configured to output a semantic label and position information of the instance in the image; and the one or more processors are further configured to: fuse feature information output by the second branch structure, feature information output by the third branch structure, and feature information corresponding to the first branch structure to obtain fused feature information; and apply the fused feature information in the first branch structure to obtain the perspective mask and the non-perspective mask.

14. The apparatus according to claim 13, wherein the one or more processors are further configured to perform pixel correction on each candidate region, to obtain a feature map of the each candidate region, the feature map of the each candidate region comprising a first feature map, a second feature map, and a third feature map, a size of the first feature map and a size of the second feature map being the same and being less than a size of the third feature map.

15. The apparatus according to claim 14, wherein the one or more processors are further configured to perform, for the each candidate region, feature fusion on the first feature map, the second feature map, and the third feature map; and input an obtained fused feature map into the first branch structure of the target network for processing.

16. The apparatus according to claim 15, wherein the one or more processors are further configured to perform concatenation on the first feature map and the second feature map, to obtain a first intermediate feature map; process the first intermediate feature map by using one deconvolutional layer and two convolutional layers in sequence, to obtain a second intermediate feature map; and perform concatenation on the second intermediate feature map and the third feature map, to obtain a third intermediate feature map, and process the third intermediate feature map by using three convolutional layers in sequence, to obtain the fused feature map.

17. The apparatus according to claim 15, wherein the one or more processors are further configured to input the fused feature map into a first deconvolutional layer for processing, to obtain a first processed feature map; and inputting the first processed feature map into a first mask branch comprised in the first branch structure, and obtain, when an instance comprised in a candidate region is an occluded instance, a non-perspective mask of the instance comprised in the candidate region.

18. The apparatus according to claim 14, wherein the one or more processors are further configured to input, for the each candidate region, the first feature map into the second branch structure for processing, to obtain the occlusion classification information of the instance comprised in the candidate region.

19. The apparatus according to claim 14, wherein the one or more processors are further configured to input, for the each candidate region, the second feature map into the third branch structure for processing, to obtain the semantic label and the position information of the instance comprised in the candidate region.

20. One or more non-transitory computer-readable storage media, each storage medium storing at least one computer-readable instruction, the at least one computer-readable instruction being loaded and executed by one or more processors to implement:

obtaining an image, and performing feature extraction on the image, to obtain a feature map of the image;

generating at least one candidate region of the image, and mapping the at least one candidate region to the feature map of the image, each candidate region comprising one instance;

processing the mapped feature map based on a target network for instance segmentation; and indicating an overall structure of an occluded instance in the image by using a perspective mask, and indicating an invisible part of the occluded instance by using a non-perspective mask, the perspective mask and the non-perspective mask representing a relative occlusion relationship of the occluded instance, wherein:

the target network comprises a first branch structure configured to obtain the non-perspective mask and the perspective mask, a second branch structure configured to output occlusion classification information of an instance comprised in the candidate region, and a third branch configured to output a semantic label and position information of the instance in the image; and processing the mapped feature map based on the target network for instance segmentation comprises: fusing feature information output by the second branch structure, feature information output by the third branch structure, and feature information corresponding to the first branch structure to obtain fused feature information; and applying the fused feature information in the first branch structure to obtain the perspective mask and the non-perspective mask.

* * * * *